United States Patent
Poojary et al.

(10) Patent No.: US 10,780,395 B2
(45) Date of Patent: Sep. 22, 2020

(54) POLLUTANT TREATMENT PROCESS AND APPARATUS

(71) Applicants: Ricardo Inc., Van Buren Township, MI (US); Ricardo UK Limited, West Sussex (GB)

(72) Inventors: Damodara M. Poojary, Van Buren Township, MI (US); Jacques F. Nicole, Palo Alto, CA (US); Matthew Keenan, West Sussex (GB)

(73) Assignees: Ricardo Inc., Van Buren Township, MI (US); Ricardo UK Limited (GB)

( * ) Notice: Subject to any disclaimer, the term of this patent is extended or adjusted under 35 U.S.C. 154(b) by 0 days.

(21) Appl. No.: 15/830,701

(22) Filed: Dec. 4, 2017

(65) Prior Publication Data
US 2019/0168159 A1  Jun. 6, 2019

(51) Int. Cl.
*B01D 53/86* (2006.01)
*B01J 23/745* (2006.01)
*B01J 35/00* (2006.01)
*B01J 37/02* (2006.01)
*B01J 37/08* (2006.01)
*C01B 3/40* (2006.01)
*B01D 53/94* (2006.01)
*B01D 53/92* (2006.01)

(52) U.S. Cl.
CPC ..... *B01D 53/8628* (2013.01); *B01D 53/8625* (2013.01); *B01D 53/8668* (2013.01); *B01D 53/9409* (2013.01); *B01J 23/745* (2013.01); *B01J 35/0006* (2013.01); *B01J 37/0201* (2013.01); *B01J 37/0236* (2013.01); *B01J 37/088* (2013.01); *C01B 3/40* (2013.01); *B01D 53/92* (2013.01); *B01D 2251/104* (2013.01); *B01D 2255/20738* (2013.01); *B01D 2255/30* (2013.01); *B01D 2256/16* (2013.01); *B01D 2257/404* (2013.01); *B01D 2257/702* (2013.01); *B01D 2258/012* (2013.01); *B01D 2258/014* (2013.01); *B01D 2258/0283* (2013.01); *C01B 2203/0261* (2013.01); *C01B 2203/1047* (2013.01); *C01B 2203/1082* (2013.01); *C01B 2203/1235* (2013.01); *C01B 2203/1247* (2013.01)

(58) Field of Classification Search
None
See application file for complete search history.

(56) References Cited

U.S. PATENT DOCUMENTS

| 2,577,563 | A | * | 12/1951 | Belchetz | C07C 1/0485 |
| | | | | | 518/702 |
| 3,342,545 | A | * | 9/1967 | Jaeger | B01D 53/34 |
| | | | | | 423/210 |
| 4,961,917 | A | | 10/1990 | Byrne | |
| 5,145,657 | A | | 9/1992 | Kobayashi et al. | |
| 5,212,140 | A | * | 5/1993 | Yoshimoto | B01D 53/8675 |
| | | | | | 423/219 |
| 5,534,237 | A | * | 7/1996 | Yoshida | B01D 53/9418 |
| | | | | | 423/213.2 |
| 5,755,977 | A | | 5/1998 | Gurol et al. | |
| 6,546,717 | B1 | * | 4/2003 | Chandler | B01D 53/56 |
| | | | | | 423/213.2 |
| 6,911,190 | B2 | | 6/2005 | Lin et al. | |
| 7,371,706 | B2 | | 5/2008 | Ohtsuka et al. | |
| 2004/0146442 | A1 | | 7/2004 | Lin et al. | |
| 2006/0034744 | A1 | * | 2/2006 | Gross | B01D 53/007 |
| | | | | | 423/245.3 |
| 2006/0225406 | A1 | * | 10/2006 | Hirata | F01N 3/206 |
| | | | | | 60/286 |
| 2007/0060472 | A1 | * | 3/2007 | Fisher | B01D 53/8675 |
| | | | | | 502/232 |

(Continued)

FOREIGN PATENT DOCUMENTS

| CN | 102600912 | * | 2/2012 |
| EP | 0361385 A2 | | 4/1990 |

(Continued)

OTHER PUBLICATIONS

Egloff, Gustav and Schaad, Raymond. "The Oxidation of the Gaseous Paraffin Hydrocarbons". Chem. Rev. 6, 91-141 (1929). (Year: 1929).*

(Continued)

*Primary Examiner* — Sheng H Davis
(74) *Attorney, Agent, or Firm* — Lerner, David, Littenberg, Krumholz & Mentlik, LLP

(57) ABSTRACT

A process for removing hydrocarbons from a feed stream containing hydrocarbons includes introducing ozone to the feed stream to produce an ozone doped stream containing ozone and hydrocarbons, and contacting the ozone doped stream with a supported metal catalyst at a temperature of from 100° C. to 300° C. to produce a treated stream, wherein the supported metal catalyst comprises iron supported on a support selected from aluminosilicates, silica-aluminas, silicates and aluminas. A process for removing $NO_x$ from a feed stream containing $NO_x$, and an apparatus for removing hydrocarbons and/or $NO_x$ from a feed stream containing hydrocarbons and/or $NO_x$ are also provided.

12 Claims, 8 Drawing Sheets

(56) References Cited

U.S. PATENT DOCUMENTS

| | | | | |
|---|---|---|---|---|
| 2009/0068093 | A1* | 3/2009 | Cho | B01D 53/945 |
| | | | | 423/713 |
| 2010/0239480 | A1* | 9/2010 | Jurng | B01D 53/261 |
| | | | | 423/239.1 |
| 2010/0287911 | A1* | 11/2010 | Katsuki | B01D 53/9477 |
| | | | | 60/274 |
| 2011/0237423 | A1* | 9/2011 | Kikuchi | B01J 29/06 |
| | | | | 502/61 |
| 2011/0305613 | A1 | 12/2011 | Stiebels et al. | |
| 2014/0260208 | A1* | 9/2014 | Sato | B01J 37/0246 |
| | | | | 60/286 |

FOREIGN PATENT DOCUMENTS

| | | | |
|---|---|---|---|
| EP | 1297885 | * | 4/2003 |
| FR | 2600329 | A2 | 12/1987 |
| FR | 2862340 | A1 | 5/2005 |
| GB | 1427614 | A | 3/1976 |
| JP | 50080263 | * | 6/1975 |
| JP | 2000279757 | A | 10/2000 |
| JP | 2000279758 | A | 10/2000 |
| JP | 2000282844 | A | 10/2000 |
| JP | 2002155809 | A | 5/2002 |
| JP | 2005314171 | A | 11/2005 |
| JP | 2008208268 | A | 9/2008 |
| JP | 2011085060 | A | 4/2011 |
| JP | 2011173883 | A | 9/2011 |
| JP | 2014047670 | A | 3/2014 |
| JP | 2014105593 | A | 6/2014 |
| JP | 2015001193 | A | 1/2015 |
| WO | 2010146156 | A1 | 12/2010 |
| WO | 2013118063 | A1 | 8/2013 |
| WO | 2017109705 | A1 | 6/2017 |

OTHER PUBLICATIONS

Schubert, Clarence, Pease, Robert "The Oxidation of Lower Parrafin Hydrocarbons". pp. 2044-2048. (1956) (Year: 1956).*

Worth et al., Characterization and Evaluation of Methane Oxidation Catalysts for Dual-Fuel Diesel and Natural Gas Engines, Emission Control Science and Technology, Oct. 2016, pp. 204-214, vol. 2, Issue 4.

International Search Report and Written Opinion for PCT/GB2018/053492, dated Feb. 5, 2019.

* cited by examiner

POLLUTANT TREATMENT PROCESS AND APPARATUS

FIELD OF THE INVENTION

The present invention relates to treatment processes and apparatus for removing pollutants from pollutant containing streams. In particular, the invention relates to a process and apparatus for removing hydrocarbons and/or $NO_x$ from a feed stream by introducing ozone to the feed stream and contacting with a supported iron catalyst at a temperature of from 100° C. to 300° C. The invention also relates to a process for generating hydrogen from a feed stream containing hydrocarbons.

BACKGROUND OF THE INVENTION

As a result of increasing global concern regarding pollutant emissions, which contribute to poor air quality and environmental damage, there is an increased focus on air quality and emissions regulations. There is therefore a need to provide means to eliminate or reduce the concentration of pollutant emissions into the atmosphere.

Pollutant emissions are often reduced by the use of catalysts, for example catalytic converters in the exhaust of vehicles. Such catalysts typically comprise precious metals such as platinum, palladium and rhodium. Precious metal catalysts add expense to pollutant removing processes and so there is a need for cheaper processes using catalysts comprising more abundant elements.

In addition, the streams from which it is desirable to remove pollutants such as hydrocarbons and $NO_x$ are often at a lower temperature than the precious metal catalysts can optimally operate under. This leads to a requirement for increased metal loading, which increases expense, and reduced efficiency at low temperature. In particular, the exhaust stream from lean systems using excess oxygen, for example from diesel engines, is typically lower than other systems leading to a reduction in the effectiveness of the precious metal catalysts designed to remove pollutants. Flue gas from combustion processes or hydrocarbon/$NO_x$ containing streams from industrial processes may also be lower in temperature than the effective operating window of traditional catalysts, for example energy may be recovered from such streams by heat exchange, lowering their temperature prior to pollutant removal.

Hydrocarbons represent one pollutant where it is desirable to minimise or eliminate release into the atmosphere. In particular, there is a desire to minimise methane emissions because methane is a potent greenhouse gas and, as such, is of concern due to its contribution to rising global temperatures. Larger hydrocarbons, for example resulting from unburnt hydrocarbons in the exhaust of internal combustion engines, can contribute to smog and may be toxic or carcinogenic. Typically, hydrocarbons are removed using catalysts such as platinum, palladium or rhodium at high temperatures. In particular, methane is a relatively stable molecule and so traditionally requires temperatures of at least around 400° C. over a precious metal based catalyst to oxidise.

As used herein, the term "$NO_x$" will be understood to mean nitrogen dioxide and nitric oxide ($NO_2$ and NO). $NO_x$ can react in the environment to form nitric acid and contribute to acid rain. $NO_2$ is a pollutant that contributes to smog and can cause respiratory problems, while NO it thought to contribute to depletion of ozone in the atmosphere and can be naturally converted to $NO_2$. $NO_x$ is typically removed using precious metal catalysts, and by the use of added reductants such as hydrogen, ammonia or urea.

U.S. Pat. No. 7,371,706 discloses a catalyst for removing hydrocarbons and nitrogen oxides from exhaust gases wherein the catalyst comprises platinum and palladium and is operated at temperatures of greater than 300° C.

"Characterization and Evaluation of Methane Oxidation Catalysts for Dual-Fuel Diesel and Natural Gas Engines", *Emission Control Science and Technology* (2016) 2, p 204-214, discloses low temperature removal of methane from exhaust gases at temperatures under 400° C. using catalysts with high loadings of platinum and palladium (up to 340 $g/ft^3$, 12,000 $g/m^3$).

There remains a need for hydrocarbon removal processes that can operate at low temperature using non-precious metal based catalyst materials.

BRIEF SUMMARY OF THE INVENTION

It has now been surprisingly found that by using a particular supported iron catalyst and ozone, hydrocarbons and $NO_x$ may be conveniently removed from feed streams at lower temperatures than are traditionally used.

Thus, in a first aspect, the present invention provides a process for removing hydrocarbons from a feed stream containing hydrocarbons, the process comprising: introducing ozone to the feed stream to produce an ozone doped stream containing ozone and hydrocarbons; and contacting the ozone doped stream with a supported metal catalyst at a temperature of from 100° C. to 300° C. to produce a treated stream; wherein the supported metal catalyst comprises iron supported on a support selected from aluminosilicates, silica-aluminas, silicates and aluminas.

It has been found that by the process of the present invention, using a particular iron catalyst in combination with ozone may result in improved effectiveness for removal of hydrocarbons from a feed stream at low temperatures. Thus, by embodiments of the process of the present invention it is possible to remove hydrocarbons from low temperature feed streams without the need for expensive precious metal catalysts with high metal loadings.

Without wishing to be bound by any particular theory, it is believed that the combination of ozone and the supported iron catalyst facilitates oxidation of hydrocarbons to carbon dioxide and carbon monoxide by the reactions shown, by way of example, for methane in Equations 1 and 2 (complete and partial oxidation).

$$CH_4 + 2O_2 \rightarrow CO_2 + 2H_2O \qquad \text{Equation 1}$$

$$CH_4 + \tfrac{1}{2}O_2 \rightarrow CO + 2H_2 \qquad \text{Equation 2}$$

It is believed that steam methane reforming may also occur with water in the feed, or generated in the reaction, to generate carbon monoxide and hydrogen as shown in Equation 3. Hydrogen may also be generated by the water gas shift reaction as shown in Equation 4.

$$CH_4 + H_2O \rightarrow CO + 3H_2 \qquad \text{Equation 3}$$

$$CO + H_2O \rightarrow CO_2 + H_2 \qquad \text{Equation 4}$$

In this way, it is believed that hydrogen formed via these reactions may assist in the concurrent removal of $NO_x$ from the feed by providing hydrogen, which can then act as a reductant as shown in Equation 5.

$$NO_x + H_2 \rightarrow N_2 + H_2O \qquad \text{Equation 5}$$

In accordance with the present invention, an ozone doped stream containing ozone and hydrocarbons is contacted with a supported iron catalyst. While some reaction between the ozone and the hydrocarbons or other components of the feed may occur after introducing the ozone to the feed but before contacting with the supported iron catalyst, it will be appreciated that the ozone doped stream that is contacted with the supported iron catalyst will contain ozone and hydrocarbons.

In accordance with the present invention, the ozone doped stream is contacted with the supported metal catalyst at a temperature of from 100° C. to 300° C. Within this range, it will be appreciated that the optimal temperature will vary and may depend, for example, on the particular composition of the feed stream or what other physical conditions are used, such as the pressure.

In preferred embodiments, the ozone doped stream is contacted with the supported metal catalyst at a temperature of from 130° C. to 280° C., preferably from 180° C. to 250° C., more preferably from 200° C. to 240° C., most preferably from 220° C. to 230° C., for example 225° C.

It has been found that by limiting the water content of the ozone doped stream, the efficiency of removing hydrocarbons from the feed at lower temperatures may be enhanced. Thus, when the ozone doped stream contains less than 2% v/v water, preferably when the ozone doped stream contains less than 1% v/v water, more preferably when the ozone doped stream contains less than 0.5% v/v water, for example when the ozone doped stream contains less than 0.1% v/v water or is substantially dry, the ozone doped stream is contacted with the supported metal catalyst at a temperature of from 100° C. to 300° C., preferably from 125° C. to 250° C., more preferably from 135° C. to 230° C., for example from 150° C. to 200° C.

It will be understood that the process of the present invention may be conducted continuously to remove hydrocarbons from a feed stream for any length of time that the catalyst retains activity. In this way, the present process may be effective during normal continuous operation of a process from which the feed stream is derived, rather than only during transitory or start-up conditions.

In preferred embodiments, the step of contacting the ozone doped stream with the supported metal catalyst comprises providing a flow of the ozone doped stream over the supported metal catalyst continuously for greater than 1 minute, optionally greater than 5 minutes, optionally greater than 30 minutes, for example greater than 1 hour. A supported metal catalyst used in accordance with the process of the present invention has been found to show no significant reduction in efficiency after several hours of continuous operation. It will therefore be appreciated that the contacting step may be conducted for greater than 2 hours, greater than 12 hours, or for 1 or more days.

It will be understood that "providing a flow of the ozone doped stream over the supported metal catalyst continuously" as described herein will refer to the contacting step at a temperature of from 100° C. to 300° C. Whilst the flow is described as continuous, it will be appreciated that the flow rate and other parameters such as the particular feed composition may vary during the specified time period as long as a flow is continuously provided over the supported metal catalyst at a temperature of from 100° C. to 300° C.

The ozone doped stream may be provided in a flow over the supported metal catalyst with any suitable flow rate and it will be appreciated that the flow rate may vary depending on the nature of the feed. For example, where a feed contains a lower concentration of hydrocarbons a higher flow rate may be selected, while for a stream containing a greater concentration of hydrocarbons a lower flow rate may be selected to maximise catalyst contact time. For example, the ozone doped stream may suitably be provided in a flow over the supported metal catalyst with a flow rate (gas hourly space velocity, GHSV) of from 100 to 100,000 $h^{-1}$, optionally from 1000 to 80,000 $h^{-1}$, optionally from 10,000 to 70,000 $h^{-1}$, optionally from 30,000 to 60,000 $h^{-1}$, for example from 40,000 to 50,000 $h^{-1}$. In some embodiments the volumetric flow rate may suitably be from 10 to 100 SLPM (standard litres per minute), although it will be appreciated that the volumetric flow rate will vary depending on catalyst volume.

The process of the present invention may be carried out at any suitable pressure. It is preferred that the contacting step is carried out at a pressure of 10 bar absolute or less, preferably 5 bar absolute or less, more preferably 2 bar absolute or less, for example at around atmospheric pressure. In preferred embodiments, the feed stream and/or the treated stream will be at a pressure of 10 bar absolute or less, preferably 5 bar absolute or less, more preferably 2 bar absolute or less, for example at around atmospheric pressure (e.g. about 1 bar absolute).

Hydrocarbons as referred to herein will be understood to mean organic compounds consisting entirely of carbon and hydrogen, for example cyclic or acyclic alkanes and alkenes. Preferably the hydrocarbons are alkanes.

Suitably, the hydrocarbons may be in the gas phase under the conditions of the process, although the hydrocarbons may also be in the liquid phase, for instance in the form of droplets or a mist.

Although it will be understood that the hydrocarbons in the feed stream of the process may be any hydrocarbons that it is desirable to remove from a particular feed stream, embodiments of the process of the present invention may be particularly effective in reducing the concentration of hydrocarbon gases. In particular, as it contains no carbon-carbon bonds, methane is a particularly stable hydrocarbon molecule that is typically difficult to remove by oxidation at low temperatures. Advantageously, embodiments of the process of the present invention may allow the removal of methane and other hydrocarbons from a hydrocarbon containing feed stream at low temperatures.

In preferred embodiments, the process of the present invention comprises removing $C_1$ to $C_{20}$ hydrocarbons from a feed stream containing $C_1$ to $C_{20}$ hydrocarbons, preferably removing $C_1$ to $C_{10}$ hydrocarbons, more preferably removing $C_1$ to $C_4$ hydrocarbons, for example removing methane from a feed stream comprising methane.

Hydrocarbons may be present in the feed stream in any amount and it will be appreciated that the amount and loading of the catalyst and the concentration of ozone used may be varied depending on the concentration of hydrocarbons in the feed stream. In some embodiments, the concentration of hydrocarbons in the feed stream is at least 50 ppm, optionally at least 100 ppm, for example 200 ppm or more.

Although it will be understood that the feed stream may contain relatively large concentrations of hydrocarbons, in some embodiments, for example where the feed stream is an exhaust stream comprising unburnt hydrocarbons, the concentration of hydrocarbons in the feed stream may be lower. For instance, the concentration of hydrocarbons in the feed stream may be less than 5% v/v, optionally less than 2% v/v, for example less than 1% v/v. In some embodiments, the concentration of hydrocarbons in the feed stream is less than 1000 ppm, optionally less than 500 ppm, for example less than 250 ppm.

As discussed, embodiments of the present process may be particularly effective for the removal of methane from feed streams. Therefore, in preferred embodiments, the feed stream contains at least 50 ppm methane, preferably at least 100 ppm methane.

It will be appreciated that the feed stream for the process of the present invention may be derived from any suitable stream of hydrocarbons from which hydrocarbon removal is desired.

While the feed stream may have any suitable concentration of hydrocarbons or other pollutants, in some embodiments the feed may be diluted, for example with air, to optimise conversion efficiency.

In some embodiments, the feed stream may comprise an exhaust stream from a hydrocarbon combustion process, for example where it is desirable to remove unburnt hydrocarbons prior to releasing the exhaust stream to the atmosphere. Such combustion processes may include combustion in internal combustion engines, for example a diesel engine, a gasoline engine or a natural gas engine. An internal combustion engine may suitably be part of a vehicle such as an automobile, a ship or an aeroplane. Alternatively an internal combustion engine may be part of a static piece of equipment such as a generator. Other hydrocarbon combustion processes may include power stations running on hydrocarbon fuels such as natural gas or oil based power stations, where the feed stream of the present process may comprise flue gas from the combustion process.

It will also be appreciated that hydrocarbon containing streams may arise from industrial processes. For example, petroleum refineries, chemical plants, natural gas processing plants, oil or gas production sites including oil wells, gas wells, offshore oil and gas rigs and landfills often use gas "flares" to burn off excess flammable gases including methane. By removing methane and other hydrocarbons using the present process, unburnt hydrocarbons such as methane released from a gas flare may be reduced or avoided and other pollutants generated in the atmosphere by the combustion process such as $NO_x$ may be reduced or avoided.

It will be appreciated that the composition of the feed stream may vary depending on the source of the feed stream. In some embodiments, in addition to hydrocarbons, the feed includes gases present in air such as oxygen, nitrogen and carbon dioxide. In particular, the feed stream may suitably comprise from 1 to 21% oxygen, optionally from 5 to 15% oxygen, for example about 10% oxygen. In some embodiments, the feed stream may suitably comprise from 50 to 90% nitrogen, optionally from 60 to 80% nitrogen, for example from 65 to 75% nitrogen. In some embodiments, the feed stream may suitably comprise from 1 to 25% carbon dioxide, optionally from 5 to 20% carbon dioxide, for example from 10 to 15% carbon dioxide. Preferably, whatever the composition of the feed stream, the balance will consist of nitrogen.

In some embodiments, the feed stream may undergo pre-processing prior to being provided to the present process. For example, the feed may be dried, heated or cooled, or may have certain compounds removed from the stream such as CO or $NO_x$. It will be appreciated that the nature of any pre-processing will vary depending on the source of the feed. In particular, by drying the feed, removing CO and/or removing NO, hydrocarbon removal may be enhanced.

The ozone introduced into the feed stream may be supplied from any suitable source of ozone. Preferably, the ozone introduced to the feed stream is generated by an ozone generator in situ. By "in situ" it will be understood that the ozone generator is situated proximate the feed stream and the supported metal catalyst such that ozone generated by the ozone generator can be fed to the feed stream on demand without substantial decomposition of the ozone.

In some embodiments, the ozone introduced to the feed stream is suitably generated by a corona discharge ozone generator, a cold plasma ozone generator or a UV ozone generator, optionally a corona discharge ozone generator. For example, an air-cooled, corona discharge ozone generator. Such ozone generators are known to the skilled person.

The ozone generator is typically fed with air to produce the ozone, however in some preferred embodiments the ozone generator may be fed with oxygen, which has been found to enhance the removal of hydrocarbons from the feed stream. It is believed that by feeding oxygen to the ozone generator, the amount of ozone that may be introduced to the feed stream may be increased.

It will be appreciated that any amount of ozone introduced to the feed stream may be used to remove hydrocarbons in the feed stream. In some embodiments, the concentration of ozone in the ozone doped stream is at least 50 ppm, optionally at least 100 ppm, optionally at least 300 ppm, for example 500 ppm or more.

The ozone may be introduced into the feed stream in any suitable manner. In some embodiments, an outlet flow from an ozone source may be fed to the feed stream prior to mixing the gases, for example using a static mixer such as a helicoidal in-line static mixer.

Many internal combustion engines use electric sparks generated by spark plugs to ignite fuel in the engine. Specialised corona discharge ignition systems may use a high energy electrical field to generate ions and ignite fuel rather than generating an arc or spark of energy as is the case with a spark plug. It will be appreciated that such spark plugs or corona discharge ignition systems can generate a corona discharge and so may produce ozone in the manner of a corona discharge ozone generator. Spark plugs or corona discharge ignition systems are typically used to ignite fuel during a compression stroke of the engine. By operating a spark plug or a corona discharge ignition system, i.e. creating a corona discharge, also during an exhaust stroke of an engine, ozone may be conveniently generated in exhaust gases in situ without the need for an external ozone generator. Although, even where a spark plug or a corona discharge ignition system is used to generate ozone, it will be appreciated that this may also be in addition to ozone provided to the exhaust stream by a different ozone generator as described previously. Thus, in some embodiments, ozone is introduced to a feed stream comprising the exhaust of an internal combustion engine by operation of a spark plug or a corona discharge ignition system during an exhaust stroke of the engine.

It will be understood that the term "ppm" as used herein is intended to mean ppm by volume fraction. Equally, unless otherwise specified, % of a gaseous stream will be understood to mean % v/v.

In some preferred embodiments, water is present in the feed stream or the ozone doped stream. It will be appreciated that the water content of the feed stream or the ozone doped stream will vary depending on the source of the feed and any prior processing of the feed. In some embodiments, water may be present in the feed stream or the ozone doped stream in an amount of up to 15% v/v, up to 5% v/v, up to 3% v/v, or up to 1% v/v, for example, up to 0.5% v/v. Therefore, hydrocarbons may be removed from a feed stream in the presence of water by the process of the present invention. In this way, the feed stream may not require drying before contacting with the catalyst.

In some preferred embodiments, where the process comprises removing methane from the feed stream and when the ozone doped stream contains more than 2% v/v water, or when the ozone doped stream contains more than 1% v/v water, for example when the ozone doped stream contains more than 0.5% v/v water, the ozone doped stream is contacted with the supported metal catalyst at a temperature of at least 130° C., preferably at least 150° C.

However, it will be appreciated that in some preferred embodiments the feed stream or the ozone doped stream may have limited water content. In particular, the feed stream or the ozone doped stream may contain less than 5% v/v water, preferably less than 2% v/v water, more preferably less than 1% v/v water, most preferably less than 0.5% v/v water, for example less than 0.1% v/v water. It has been found that by limiting the water content of the ozone doped stream, the efficiency of removing hydrocarbons from the feed at low temperatures may be enhanced. Thus, in some preferred embodiments, the feed stream is dried prior to feeding to the process of the present invention. In some embodiments the feed may be naturally dry and may not require drying to remove water.

Nonetheless, it has also been found that, when water is present in the feed stream, $NO_x$ may advantageously be removed at low temperatures along with hydrocarbons. In this way, the presence of water in the feed stream can enhance the overall pollutant removal effect of the process. This is particularly surprising as $NO_x$ removal processes typically use added reductant such as ammonia or urea to reduce the $NO_x$, while in the present process an oxidant is added in the form of ozone.

Thus, in preferred embodiments, the feed stream further comprises $NO_x$. In some preferred embodiments, the concentration of $NO_x$ in the feed stream is at least 50 ppm, optionally at least 100 ppm, optionally at least 300 ppm, for example at least 500 ppm.

In some preferred embodiments, when the ozone doped stream contains $NO_x$, the ozone doped stream contains at least 0.5% v/v water, preferably the ozone doped stream contains at least 1% v/v water, more preferably the ozone doped stream contains at least 2% v/v water.

Where water is not present in the feed stream as a result of the nature or origin of the feed stream, water may be added to the feed stream as required in any suitable manner. In some embodiments water may be provided with the ozone into the feed to give an ozone doped stream comprising water.

It has been found that where an amount of NO is present in the feed stream, the removal of hydrocarbons from the feed stream may be negatively affected. Therefore, in preferred embodiments the concentration of NO in the feed stream is less than 200 ppm, preferably less than 100 ppm, more preferably less than 50 ppm, for example less than 20 ppm.

Similarly, the presence of CO in the feed stream, which may for example be present as a result of incomplete combustion in a combustion process, can negatively affect the removal of hydrocarbons from the feed stream. Therefore, in preferred embodiments, the concentration of CO in the feed stream is less than 200 ppm, preferably less than 100 ppm, more preferably less than 50 ppm, for example less than 20 ppm.

In preferred embodiments, the feed stream contains less CO and/or NO than hydrocarbons by volume. For example, the feed stream contains less than 100% v/v CO and/or NO relative to the hydrocarbons in the feed stream, preferably less than 50%, more preferably less than 20%, for example less than 5%. In some embodiments, when the feed stream contains more than these proportions of CO and/or NO relative to the hydrocarbons in the feed stream, the ozone doped stream is contacted with the supported metal catalyst at a temperature of at least 130° C., preferably at least 150° C.

It will be appreciated that CO and/or NO may react with the ozone, reducing the efficiency of hydrocarbon removal. Therefore, the amount of CO and/or NO in the ozone doped stream is preferably less than 50% of the ozone concentration in the ozone doped stream, more preferably less than 20%.

The support of the supported metal catalyst is suitably selected from aluminosilicates, silica-aluminas, silicates and aluminas. It will be understood that the support referred to herein is a solid porous material upon which iron may be supported to form the catalyst. Preferably, the support is an aluminosilicate support. In particularly preferred embodiments the support is a zeolite support, for example beta zeolite.

The support may have various pore sizes or geometries. In some embodiments, the support is of the 10-membered ring variety (10 oxygen atoms in the ring defining the pore opening) or 12-membered ring variety (12 oxygen atoms in the ring defining the pore opening).

The support may have any suitable pore size. In some embodiments, an intermediate pore size support may be used having a minimum pore opening diameter when the support is in the calcined form of 4.8 Å or 5.3 Å, and a maximum pore opening diameter of 7.1 Å or 6.5 Å. In other embodiments a large-pore support may be used having pore opening diameters of at least 5 Å, at least 6 Å, or at least 7 Å. In other embodiments, the support may be a support having a relatively small pore opening diameter, for example less than 5 Å.

Particular examples of large pore size supports include ZSM-3, ZSM-12, ZSM-20, MCM-37, MCM-68, ECR-5, SAPO-5, SAPO-37, as well as beta, Y, ultra-stable Y (USY), and mordenite zeolites. Intermediate pore size supports include ZSM-22, ZSM-23, ZSM-35, ZSM-48, ZSM-57, SAPO-11, MAPO-11, SM-3, SM-6, SSZ-32 and ferrierite. Preferably the support is a zeolite having a BEA type framework, for example in preferred embodiments the support is zeolite beta. In some embodiments the support is a relatively small pore size support such as a chabazite zeolite. Zeolite supports may have any suitable silica to alumina ratio, for example, in some embodiments the silica to alumina ratio may suitably be from 1 to 150, optionally from 5 to 100, for example 10 to 50.

The support may be synthesized by any suitable method and such methods are known in the art. For example, a description of the synthesis of zeolite beta is provided in U.S. Pat. No. 4,961,917 and WO 2010/146156 A. Suitable supports may also be obtained commercially.

The loading of iron on the supported catalyst may be any suitable amount depending on the desired use and catalyst activity. The loading of the iron on the supported catalyst may typically be from 0.1 to 20 wt. %, based on the total weight of the supported catalyst, for example from 0.3 to 10 wt. %, 2 to 7 wt. % or 2.5 to 5 wt. %. The iron on the supported catalyst may suitably be in the form of $Fe_2O_3$.

The supported metal catalyst comprises iron and may additionally comprise other materials, for example promoters, dispersion aids, strength aids and/or binders. Nonetheless, in some embodiments the catalyst consists essentially of iron supported on a support as described previously.

In some embodiments, the catalyst may comprise other transition metals in addition to iron, which may be similarly incorporated into the catalyst as described hereafter. However, it will be appreciated that metals other than iron are not required in the process of the present invention. In particular, the process of the present invention may advantageously avoid the use of expensive precious metals typically used for treating pollutant streams such as platinum, palladium and rhodium. In preferred embodiments, the supported metal catalyst comprises less than 1 wt. % total platinum, palladium and rhodium based on the total weight of the supported catalyst, preferably less than 0.5 wt. %, more preferably less than 0.1 wt. % for example less than 0.01 wt. %. In some preferred embodiments, the supported metal catalyst comprises substantially no platinum, palladium or rhodium. In other preferred embodiments the supported metal catalyst comprises less than 1 wt. % total silver based on the total weight of the supported catalyst, preferably less than 0.5 wt. %, more preferably less than 0.1 wt. % for example less than 0.01 wt. %. In some preferred embodiments, the supported metal catalyst comprises substantially no silver.

The support may be suitably loaded with metals by any method familiar to the skilled person, for example, impregnation, ion-exchange or precipitation, preferably ion-exchange. Examples of supported iron materials and methods of preparation are described in, for example US 2011/305613, WO 2013/118063 and WO 2017/109705.

For example, a suitable impregnation method may comprise impregnating a solid support material with a metal compound which is thermally decomposable to the oxide form, for example a metal nitrate, sulfate or acetate. Any suitable impregnation technique may be used, including the incipient wetness technique or the excess solution technique, which are well-known in the art. The incipient wetness technique requires that the volume of impregnating solution be such that it provides the minimum volume of solution required to just wet the entire surface of the support, with no excess liquid. The excess solution technique requires an excess of the impregnating solution, and removal of the solvent, typically by evaporation.

The solution used for impregnation may be any suitable solution, for example an aqueous solution or a non-aqueous, organic solution of the iron compound. Non-aqueous organic solvents include, for example, alcohols, ketones, liquid hydrocarbons and ethers. Aqueous organic solutions such as aqueous alcoholic solutions may alternatively be used. The support material that is impregnated may be in a powder, granular or pelletized form. Support material which is in the form of a shaped extrudate may also be used for impregnation.

The support may be dried and optionally calcined prior to and/or after impregnation and such processes are known to the skilled person. In particular, the support may for instance be dried in air at a temperature of 100° C. or more, for example 120° C. or 150° C., for a suitable amount of time, for example 2 hours or 12 or more hours. Calcination may suitably be performed at a temperature of from 200° C. to 800° C., for example from 400° C. to 600° C.

It will be understood that the supported metal catalyst may also be obtained commercially.

The supported metal catalyst may suitably be formed from self-supporting particles or may loaded onto a substrate. For example, the catalyst may be applied to a substrate as a washcoat or in any other suitable manner. Preferably the catalyst is applied to a substrate as a washcoat. A washcoat may suitably be applied to a substrate such that the washcoat loading on the substrate is from about 100 g/l to 300 g/l, for example about 125 g/l to 260 g/l.

The substrate may be formed from any suitable material. For example, the substrate may be metal, for instance a heat resistant metal or alloy such as titanium or stainless steel. Alternatively, ceramic refractory materials may be used such as cordierite. The substrate may be in the form of a substrate having a plurality of gas flow passages or "cells" extending from an inlet to an outlet. The cell density may be any suitable value and may range, for instance from 50 to 1000 cpsi (cells per square inch of cross-section). It will be appreciated that the cell density may be varied depending on the properties or origin of the feed stream. For example, the cell density may optionally be from 200 to 600 cpsi where the feed stream comprises an exhaust stream from a diesel engine, or may optionally be from 600 to 1000 cpsi where the feed stream comprises an exhaust stream from a gasoline engine.

It will be appreciated that, by the reactions in previously described Equations 2 to 4, hydrogen may be generated by the removal of hydrocarbons from a feed stream in accordance with the present process. Thus, in preferred embodiments, the treated stream has an increased concentration of hydrogen relative to the feed stream.

It has also been found that $NO_x$ may be removed from a feed stream containing $NO_x$ and water using ozone and the supported metal catalyst, where the presence of hydrocarbons in the feed stream is not required.

Thus, in a further aspect, there is provided a process for removing $NO_x$ from a feed stream containing $NO_x$, the process comprising: introducing ozone to the feed stream to produce an ozone doped stream containing ozone and $NO_x$; and contacting the ozone doped stream with a supported metal catalyst at a temperature of from 100° C. to 300° C. to produce a treated stream; wherein the supported metal catalyst comprises iron supported on a support selected from aluminosilicates, silica-aluminas, silicates and aluminas, and wherein the ozone doped stream contains water.

It has also been found that, when water is present in the feed stream, $NO_x$ may advantageously be removed at low temperatures from a feed stream containing $NO_x$. This is particularly surprising as $NO_x$ removal processes typically use high temperatures and precious metal catalysts or added reductant such as ammonia or urea to reduce the $NO_x$, while in the present process an oxidant is added in the form of ozone and the process is conducted a low temperatures. In accordance with the process of this aspect, $NO_x$ may be removed from a feed stream at low temperatures without requiring the presence of precious metals or added reductants.

The combination of ozone and the supported metal catalyst has been found to enhance the removal of $NO_x$ in the presence of water. Without wishing to be bound by any particular theory it is believed that NO in the feed stream may be converted to $NO_2$ by reaction with ozone. The $NO_2$ then, in the presence of water and the catalyst, can form nitric acid, removing $NO_x$ from the treated stream. Where hydrogen is present or generated in the feed, the $NO_x$ may also be reduced to $N_2$, although this is not believed to be necessary for $NO_x$ removal.

Nitric acid may then optionally be removed from the treated stream by any suitable process. For example, nitric acid could be removed from the treated stream using an acid scrubber such as are known to the skilled person. In some embodiments a scrubber used for removing sulfuric acid from a stream may conveniently be used to also remove nitric acid formed from $NO_x$ in accordance with the present process.

It will be appreciated that the amount of water in the ozone doped stream may be varied depending on the composition of the feed stream, for example the concentration of $NO_x$ in the feed stream. In preferred embodiments the ozone doped stream contains at least 0.5% v/v water, preferably the ozone doped stream contains at least 1% v/v water, more preferably the ozone doped stream contains at least 2% v/v water.

It will be understood that the conditions during the process such as during the contacting step, the manner and means of ozone introduction, the nature of the supported metal catalyst, and the feed or ozone doped stream composition may be substantially as defined previously herein in relation to the first aspect, as long as the feed stream contains $NO_x$ and the ozone doped stream contains water.

Removing hydrocarbons or removing $NO_x$ from a stream as described herein, will be understood to mean that the concentration of hydrocarbons or $NO_x$ are reduced relative to the feed stream. In some embodiments, removing hydrocarbons or $NO_x$ from the feed stream comprises removing substantially all of the hydrocarbons or $NO_x$ from the feed stream, although this is not required.

In a further aspect, there is provided an apparatus for removing hydrocarbons and/or $NO_x$ from a feed stream containing hydrocarbons and/or $NO_x$, the apparatus comprising: a source of ozone arranged to introduce ozone to the feed stream to produce an ozone doped stream containing ozone and hydrocarbons and/or $NO_x$; a supported metal catalyst comprising iron supported on a support selected from aluminosilicates, silica-aluminas, silicates and aluminas; wherein the apparatus is arranged to contact the ozone doped stream with the supported metal catalyst at a temperature of from 100° C. to 300° C.

It will be appreciated that the feed stream may come from any source. However, in some preferred embodiments the apparatus is arranged to receive an exhaust stream from a hydrocarbon combustion process or a waste gas stream from an industrial process as at least a portion of the feed stream as described previously herein.

In some embodiments the apparatus further comprises means for carrying out hydrocarbon combustion and feeding an exhaust or flue stream to the apparatus as at least a portion of the feed stream. For example, the means for carrying out hydrocarbon combustion may comprise an internal combustion engine, for instance a diesel engine, a gasoline engine or a natural gas engine.

It will be understood that the supported metal catalyst and source of ozone may be substantially as described previously herein. It will also be appreciated that the apparatus may be configured for use with a feed stream or configured to provide an ozone doped stream substantially as described previously herein.

In some embodiments, the apparatus is configured so that the ozone doped stream is contacted with the supported metal catalyst at a temperature of from 130° C. to 280° C., preferably from 180° C. to 250° C., more preferably from 200° C. to 240° C., most preferably from 220° C. to 230° C., for example 225° C. It will be appreciated that the apparatus may be configured so that the ozone doped stream is contacted with the supported metal catalyst at a temperature substantially as described previously herein.

Preferably, the apparatus is configured to provide a flow of the ozone doped stream over the supported metal catalyst continuously for greater than 1 minute, greater than 5 minutes, or greater than 30 minutes, for example greater than 1 hour. Therefore, the apparatus may be configured to provide a flow of the ozone doped stream over the supported metal catalyst during normal continuous operation of a process from which the feed stream is derived, rather than only during transitory or start-up conditions.

The apparatus may be configured to contact the ozone doped stream with the supported metal catalyst at any suitable pressure. In preferred embodiments, the apparatus is configured to contact the ozone doped stream with the supported metal catalyst at a pressure of 10 bar absolute or less, preferably 5 bar absolute or less, more preferably 2 bar absolute or less, for example at around atmospheric pressure.

Preferably, the source of ozone comprises an ozone generator configured to generate ozone in situ as described previously herein. The ozone generator may suitably comprise a corona discharge ozone generator, a cold plasma ozone generator or a UV ozone generator, optionally a corona discharge ozone generator.

A further aspect provides a vehicle or industrial processing plant comprising an apparatus as described herein for reducing emissions of hydrocarbons and/or $NO_x$. For example a vehicle such as an automobile, a ship or an aeroplane, or an industrial processing plant such as petroleum refineries, chemical plants, natural gas processing plants, oil or gas production sites including oil wells, gas wells, offshore oil and gas rigs and landfills.

As discussed previously, by the reactions in previously described Equations 2 to 4, hydrogen may be generated by the removal of hydrocarbons from a feed stream in accordance with the present process.

Therefore, a further aspect provides a process for generating hydrogen from a feed stream containing hydrocarbons, the process comprising: introducing ozone to the feed stream to produce an ozone doped stream containing ozone and hydrocarbons; and contacting the ozone doped stream with a supported metal catalyst at a temperature of from 100° C. to 300° C. to produce a hydrogen enriched stream; wherein the supported metal catalyst comprises iron supported on a support selected from aluminosilicates, silica-aluminas, silicates and aluminas.

Hydrogen is typically generated from hydrocarbons by steam reforming using nickel or precious metal catalysts at high temperatures of 700° C. to 1100° C. By the present process hydrogen may suitably be produced at low temperatures using an iron based catalyst.

It will be appreciated that the conditions during the process such as during the contacting step, the manner and means of ozone introduction, the nature of the supported metal catalyst, and the feed or ozone doped stream composition may be substantially as defined previously herein in relation to the first aspect.

In particular, in some preferred embodiments, where the hydrocarbon comprises methane and when the ozone doped stream contains more than 2% v/v water, or when the ozone doped stream contains more than 1% v/v water, for example when the ozone doped stream contains more than 0.5% v/v water, the ozone doped stream is contacted with the supported metal catalyst at a temperature of at least 130° C., preferably at least 150° C.

It has been found that by limiting the water content of the ozone doped stream, the efficiency of generating hydrogen from the feed at lower temperatures may be enhanced. Thus, when the ozone doped stream contains less than 2% v/v water, preferably when the ozone doped stream contains less than 1% v/v water, more preferably when the ozone doped stream contains less than 0.5% v/v water, for example when the ozone doped stream contains less than 0.1% v/v water or is substantially dry, the ozone doped stream is contacted with the supported metal catalyst at a temperature of from 100° C. to 300° C., preferably from 150° C. to 250° C., more preferably from 175° C. to 245° C., for example from 200° C. to 235° C.

Thus, according to embodiments of the present invention, hydrogen may be generated at lower temperatures than are typically required when using nickel or precious metal catalysts.

It has been found that where an amount of NO is present in the feed stream, the generation of hydrogen from the feed stream may be negatively affected. Therefore, in preferred embodiments the concentration of NO in the feed stream is less than 200 ppm, preferably less than 100 ppm, more preferably less than 50 ppm, for example less than 20 ppm.

Similarly, the presence of CO in the feed stream may negatively affect the generation of hydrogen from the feed stream. Therefore, in preferred embodiments, the concentration of CO in the feed stream is less than 200 ppm, preferably less than 100 ppm, more preferably less than 50 ppm, for example less than 20 ppm.

Thus, by limiting the amounts of water, NO and/or CO in the feed stream, the generation of hydrogen from the feed stream may be enhanced at low temperatures.

A further aspect provides use of ozone and a supported metal catalyst comprising iron supported on a support selected from aluminosilicates, silica-aluminas, silicates and aluminas for removing hydrocarbons from a feed stream containing hydrocarbons, by introducing ozone to the feed stream to produce an ozone doped stream and contacting the ozone doped stream with the supported metal catalyst.

It will be appreciated that the use of this aspect may be substantially as described previously herein in relation to removing hydrocarbons from a feed stream.

A further aspect provides use of ozone and a supported metal catalyst comprising iron supported on a support selected from aluminosilicates, silica-aluminas, silicates and aluminas for removing $NO_x$ from a feed stream containing $NO_x$, by introducing ozone to the feed stream to produce an ozone doped stream and contacting the ozone doped stream with the supported metal catalyst.

It will be appreciated that the use of this aspect may be substantially as described previously herein in relation to removing $NO_x$ from a feed stream.

A further aspect provides use of ozone and a supported metal catalyst comprising iron supported on a support selected from aluminosilicates, silica-aluminas, silicates and aluminas for generating hydrogen from a feed stream comprising hydrocarbons, by introducing ozone to the feed stream to produce an ozone doped stream and contacting the ozone doped stream with the supported metal catalyst.

It will be appreciated that the use may be substantially as described previously herein in relation to generating hydrogen from a feed stream comprising hydrocarbons.

BRIEF DESCRIPTION OF THE DRAWINGS

The present invention will now be illustrated by way of the following examples and with reference to the following figures in which.

DETAILED DESCRIPTION

Examples

General Procedure for Catalyst Preparation

Catalysts were either obtained commercially or synthesised by wet impregnation of the support with an aqueous solution of a metal nitrate, followed by drying in air at 150° C. for 2 hours and thermal decomposition in air at 550° C. for 8 hours.

Catalysts were loaded into cordierite cores of 1 inch diameter and 3 inch long with a 300 CPSI cell density and a volume of 38.6 ml. The catalyst slurry was coated onto the cordierite by a dipping process and then dried.

Figure 15:
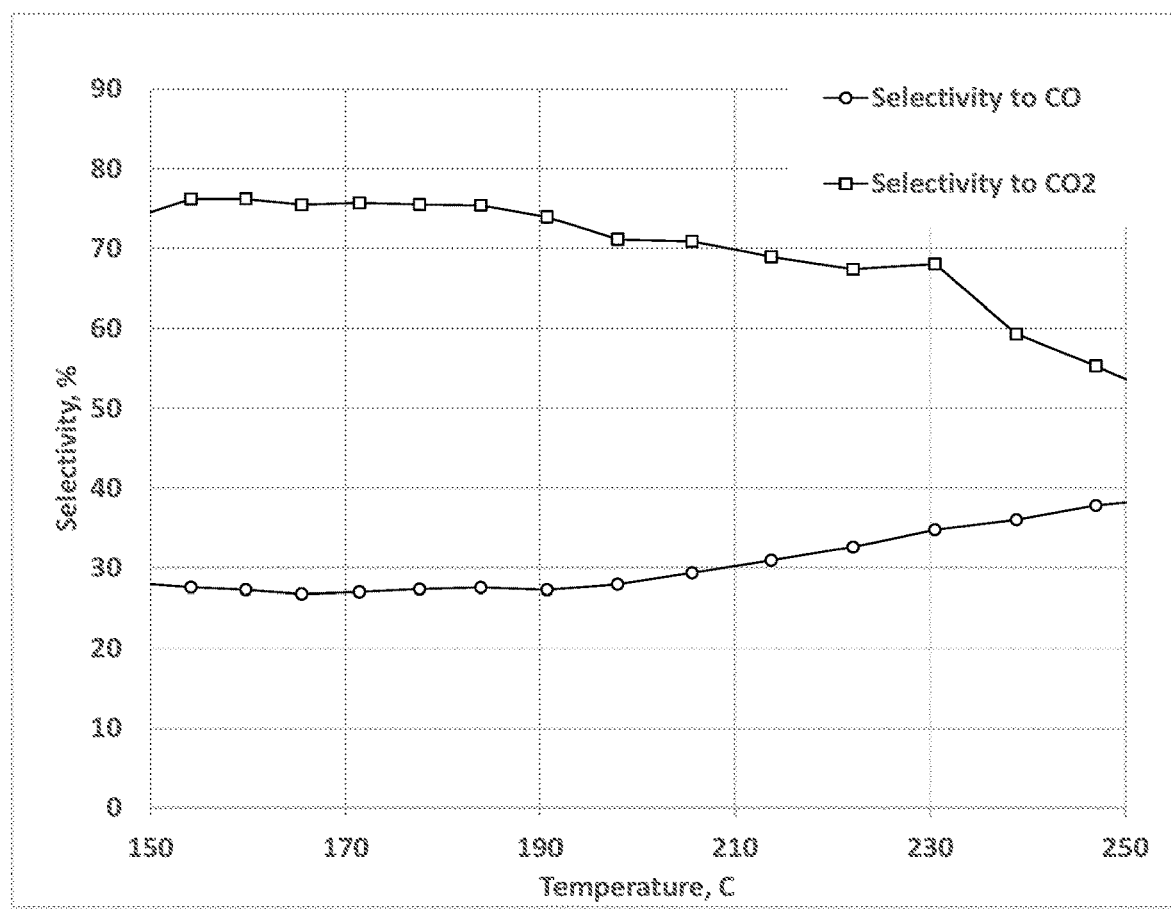
FIG. 15 is a graph showing CO and $CO_2$ selectivity against temperature in accordance with Example 4.
Figure 16:
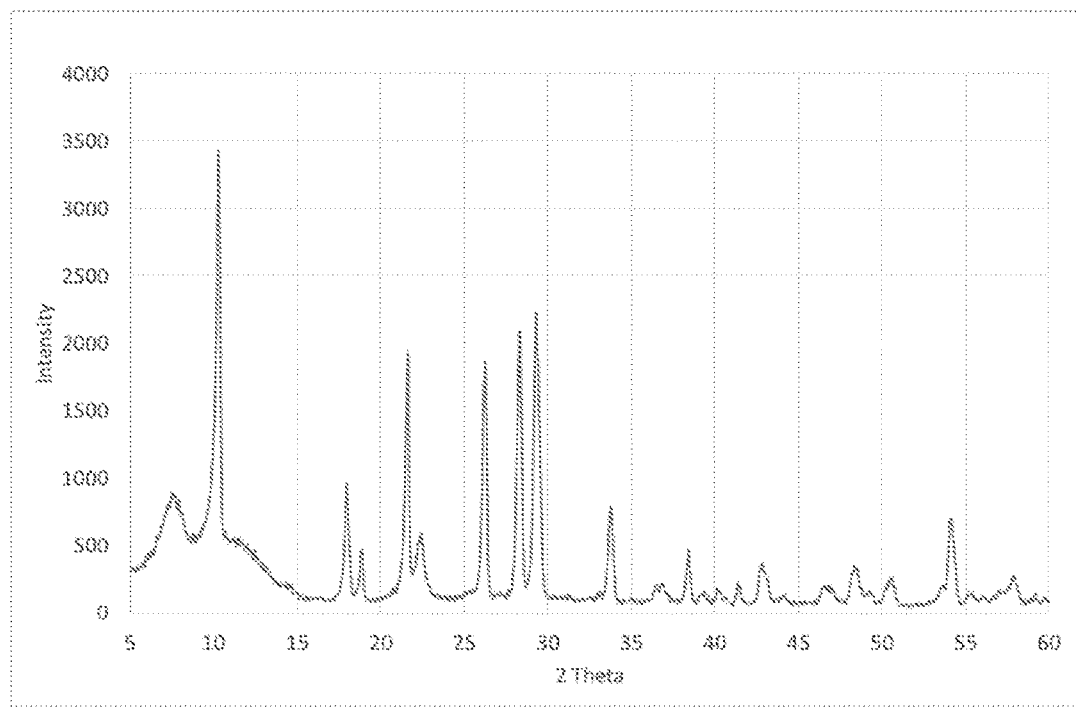
FIG. 16 is an X-Ray diffraction spectrum of an iron on beta zeolite catalyst on cordierite as used in Examples 1 to 7 and Comparative Example 1.

A powder X-Ray diffraction spectrum for the iron on beta zeolite catalyst on cordierite, as used in Examples 1 to 7 and Comparative Example 1 is shown in FIG. 15.

General Procedure for Reactor Experiments

All experiments were conducted in a bench scale continuous flow reactor comprising an in-line heater, gas injection ports, water injector and vaporizer, in-line mixer, sample ports, sample holder, and exhaust. Gases were mixed by a helicoidal stainless steel in-line static mixer directly upstream of the catalyst sample. The ozone was generated by an air-cooled, corona discharge ozone generator. The ozone generator was fed with dry air unless otherwise specified. The 5 SLPM ozone containing outlet stream of the ozone generator was fed to the reactor directly upstream of the static mixer. Ozone concentration in the feed to the reactor is estimated to be around 500 ppm. Unless otherwise specified, the feed contained 10% oxygen and the balance of the feed was nitrogen. The flow rate through the reactor was 25 to 30 SLPM with a space velocity of from 40,000 h$^{-1}$ to 50,000 h$^{-1}$. Outlet gas samples were analysed continuously by a FTIR gas analyser capable of simultaneous quantitative analysis of more than 30 gases. Sample gas temperature was maintained at 150° C. or 191° C. Specifically, gases were monitored continuously in the exhaust gas and logged at 1 hertz. Catalyst sample temperature was controlled by an in-line gas heater and monitored by five Type-K thermocouples inserted in the catalyst sample channels. Catalyst temperature was either maintained constant or ramped up or down at a controlled rate between 0° C. and 25° C. per minute, generally around 5° C. to 10° C. per minute. Inlet gas blend composition was controlled by mass flow controllers and a high precision liquid water pump. The outlet of the catalyst sample was maintained at atmospheric pressure.

In each case the observed products were largely CO, $CO_2$ and water. For a propane feed (Example 3), some formation of formaldehyde was observed in addition to CO and $CO_2$.

Example 1

A reactor experiment was conducted according to the general procedure above with a feed stream comprising methane (150 ppm) and less than 0.1% water. Temperature was ramped up from around 80° C. to 400° C. The catalyst used was a catalyst comprising iron on beta zeolite. The methane conversion with varying temperature is shown in FIG. 1.

Figure 1:
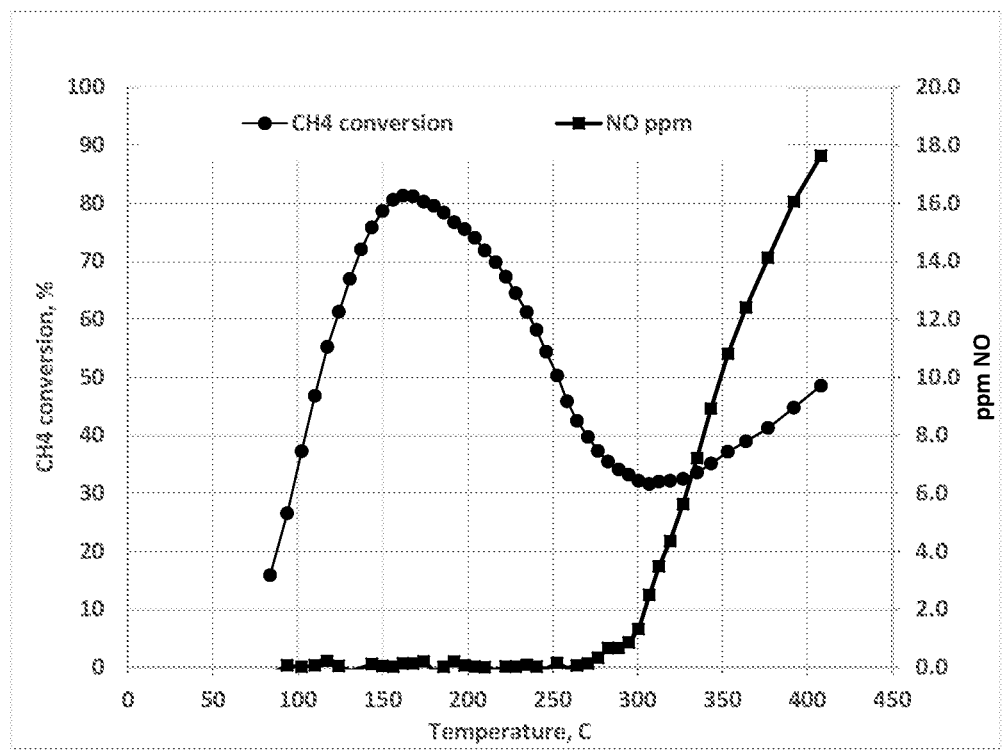
FIG. 1 is a graph showing methane conversion and NO outlet concentration against temperature in accordance with Example 1.

FIG. 1 shows that by using the iron catalyst in combination with ozone, very good methane conversion efficiency can be obtained at temperatures of from 100° C. to 300° C.

Example 2

A reactor experiment was conducted according to the general procedure above with a feed stream comprising methane (156 ppm) and water (2.5%). Temperature was ramped up from around 110° C. to 360° C. The catalyst used was a catalyst comprising iron on beta zeolite. The methane conversion with varying temperature is shown in FIG. 2.

The temperature was then held constant at around 225° C. and the water content of the stream was varied from around 5% to 0%. The methane conversion with varying water concentration is shown in FIG. 3.

Figure 2:
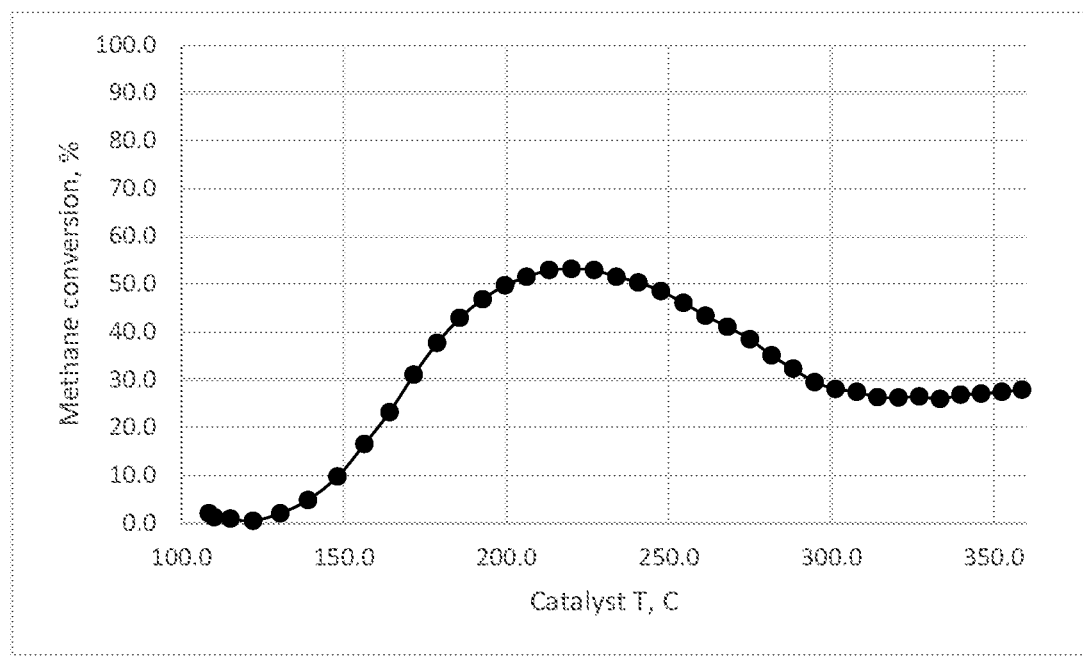
FIG. 2 is a graph showing methane conversion against temperature in accordance with Example 2.
Figure 3:
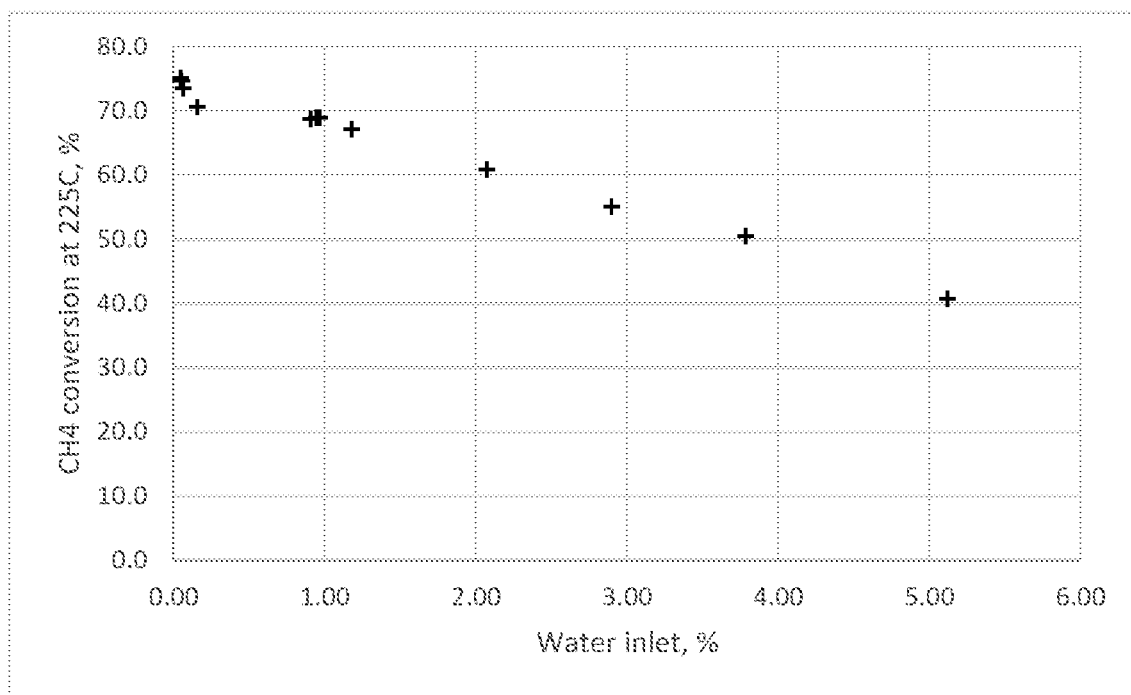
FIG. 3 is a graph showing methane conversion against water concentration in accordance with Example 2.

The results in FIGS. 2 and 3 show that good methane conversion may be obtained in the presence of water at low temperatures and that the conversion may be improved by reducing the level of water in the feed.

Example 3

A reactor experiment was conducted according to the general procedure above with a feed stream comprising propane (223 ppm) and water (2.5%). Temperature was ramped up from around 120° C. to 400° C. The catalyst used was a catalyst comprising iron on beta zeolite. The propane conversion with varying temperature is shown in FIG. 4.

Figure 4:
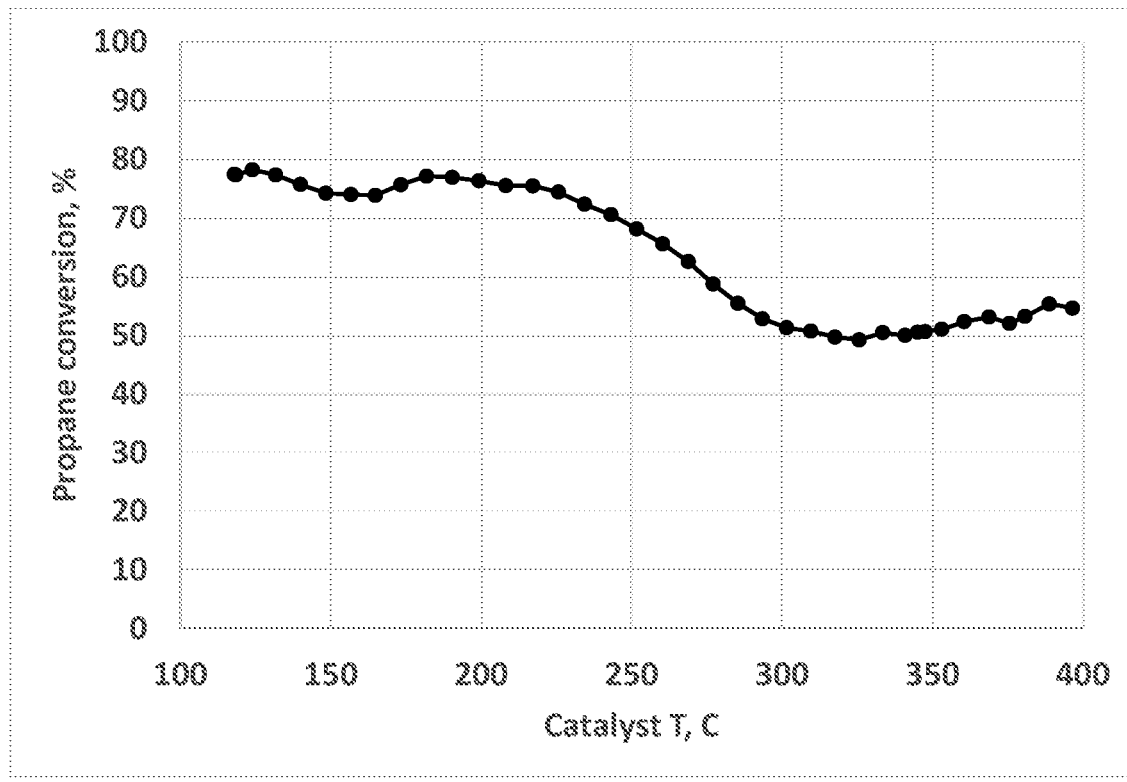
FIG. 4 is a graph showing propane conversion against temperature in accordance with Example 3.

The results in FIG. 4 show very good conversion of propane at temperatures below 300° C., showing that the combination of the iron catalyst and ozone is also effective for longer chain hydrocarbons.

Example 4

Figure 5:
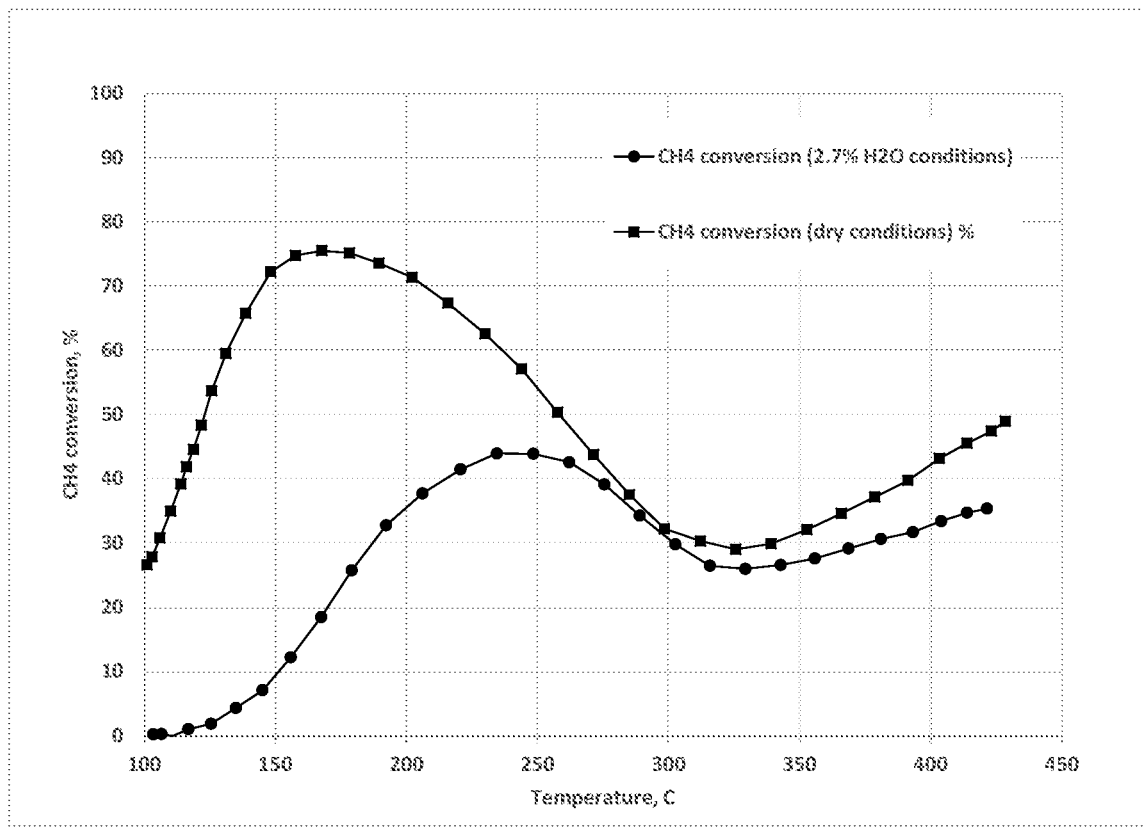
FIG. 5 is a graph showing methane conversion against temperature with and without water in accordance with Example 4.

A reactor experiment was conducted according to the general procedure above with a feed stream comprising methane (155 ppm). Temperature was ramped down from around 430° C. to 100° C. The catalyst used was a catalyst comprising iron on beta zeolite. The same experiment was conducted with a feed comprising 155 ppm methane and 2.7% water. The methane conversion with varying temperature for the two experiments is shown in FIG. 5. The selectivity for conversion to CO is shown in FIG. 6.

Figure 6:
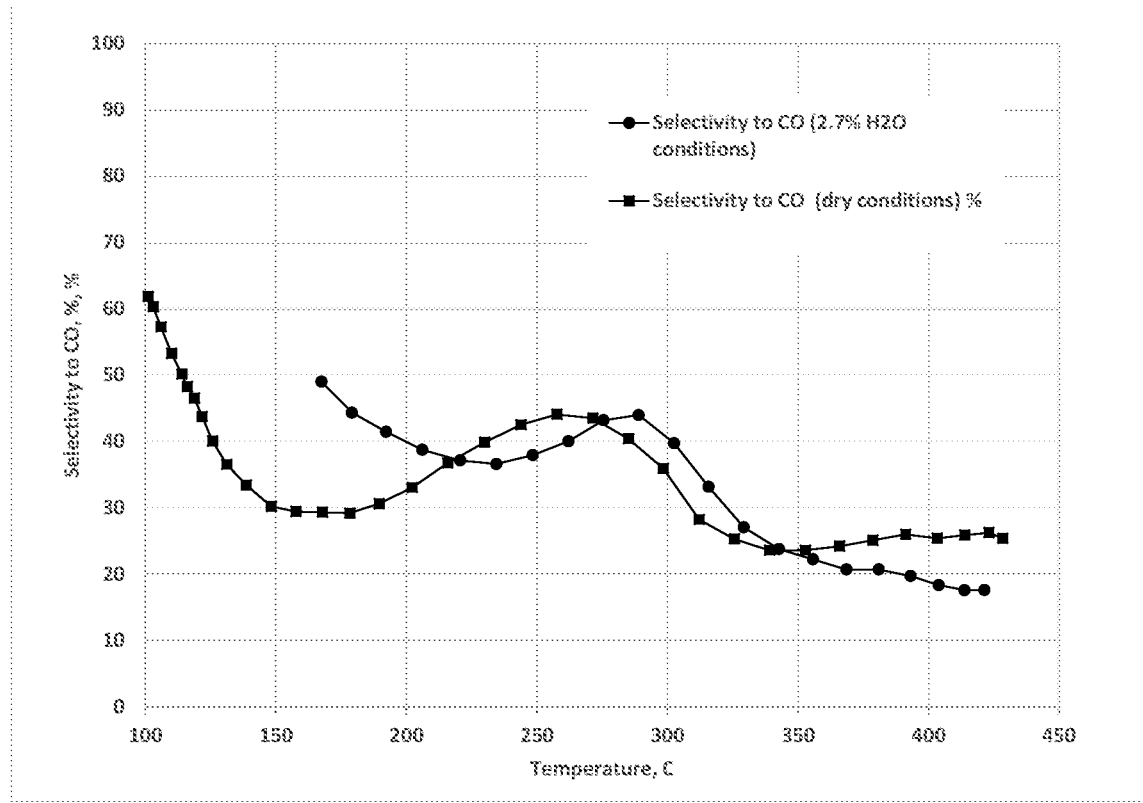
FIG. 6 is a graph showing CO selectivity against temperature in accordance with Example 4.

The results in FIGS. 5 and 6 show that at low temperatures, there is increased selectivity CO. It will be appreciated that as a result of the reactions shown in Equations 2 and 3 previously, the presence of CO may be used to infer the production of hydrogen from the methane in the feed stream.

This experiment was repeated with a feed comprising 180 ppm methane and without water and CO and $CO_2$ selectivity was monitored. The CO and $CO_2$ selectivity is shown in FIG. 15, which demonstrates that CO and $CO_2$ are the major carbon containing products formed in the process.

Example 5

A reactor experiment was conducted according to the general procedure above with a feed stream comprising methane (180 ppm), NO (150 ppm) and water (2.7%). Temperature was ramped up from around 120° C. to 400° C. The catalyst used was a catalyst comprising iron on beta zeolite. The methane and $NO_x$ conversions with varying temperature are shown in FIG. 7.

Figure 7:
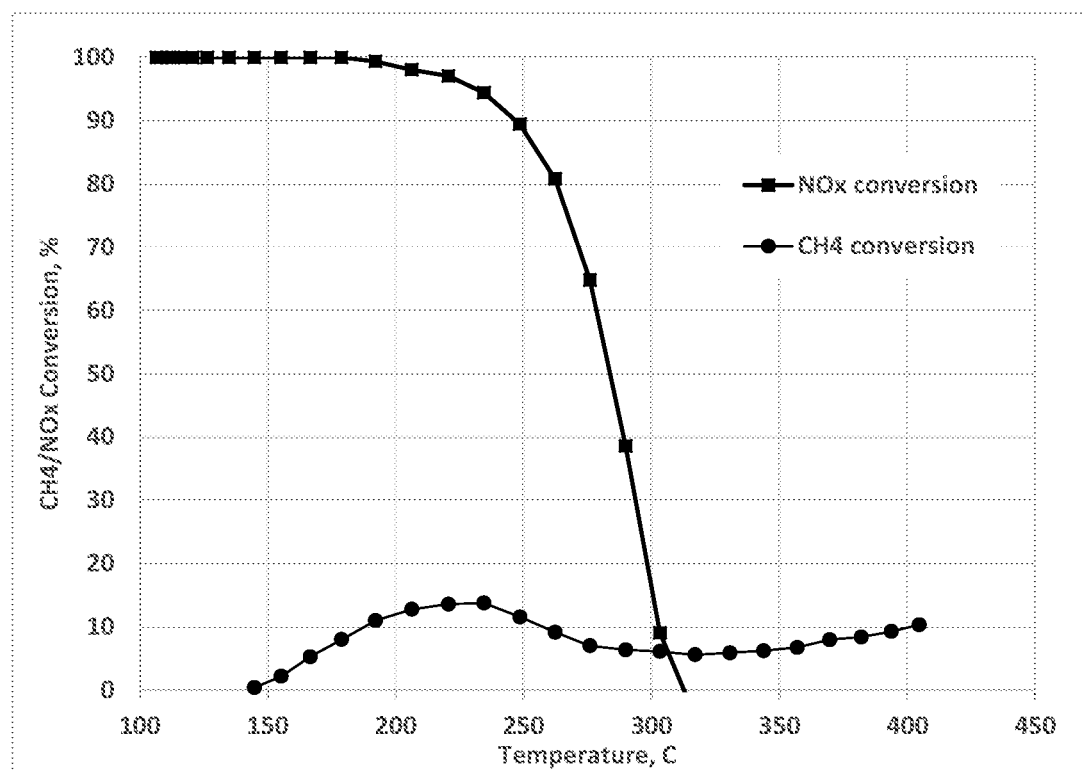
FIG. 7 is a graph showing $NO_x$ conversion against temperature in accordance with Example 5.

The data in FIG. 7 shows that NOx may be effectively removed at low temperatures by using ozone and the iron catalyst below 300° C., whilst also simultaneously removing methane from the feed.

Example 6

A reactor experiment was conducted according to the general procedure above with a feed stream comprising NO (157 ppm) and water (2.5%). Temperature was ramped up from around 210° C. to 420° C. The catalyst used was a catalyst comprising iron on beta zeolite. The same experiment was then repeated by ramping down the temperature instead of ramping up. The $NO_x$ conversion with varying temperature is shown in FIG. 8.

Figure 8:
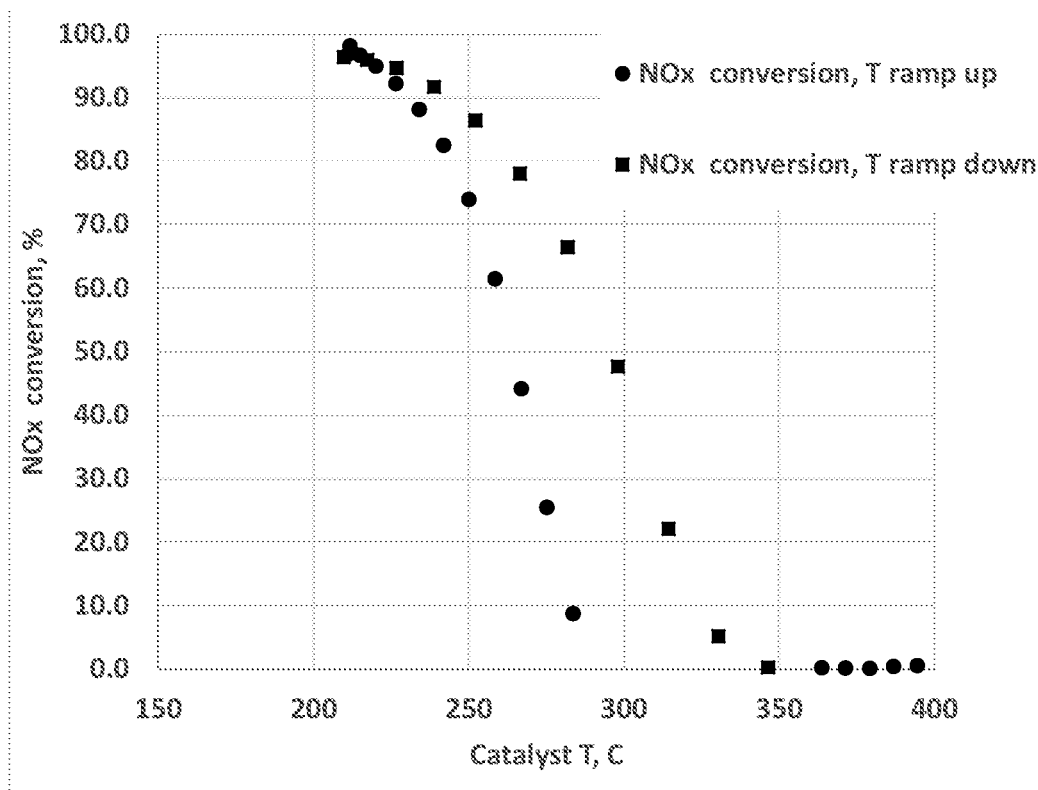
FIG. 8 is a graph showing methane and $NO_x$ conversion against temperature in accordance with Example 6.

The data in FIG. 8 shows that $NO_x$ may be effectively removed at low temperatures by using ozone and the iron catalyst below 300° C. in the absence of hydrocarbons. It was also found that when water was absent from the feed, temporary adsorption of $NO_x$ was observed rather than conversion.

Example 7

The procedure of Example 5 was modified so that oxygen is fed to the ozone generator instead of air, which gave an improvement to the observed methane conversion.

Comparative Example 1

A reactor experiment was conducted according to the general procedure above with a feed stream comprising methane (180 ppm), NO (150 ppm) and water (2.7%) and without the addition of ozone to the feed. Temperature was ramped down from around 425° C. to 150° C. The catalyst used was a catalyst comprising iron on beta zeolite. The methane and $NO_x$ conversions with varying temperature are shown in FIG. 9.

Figure 9:
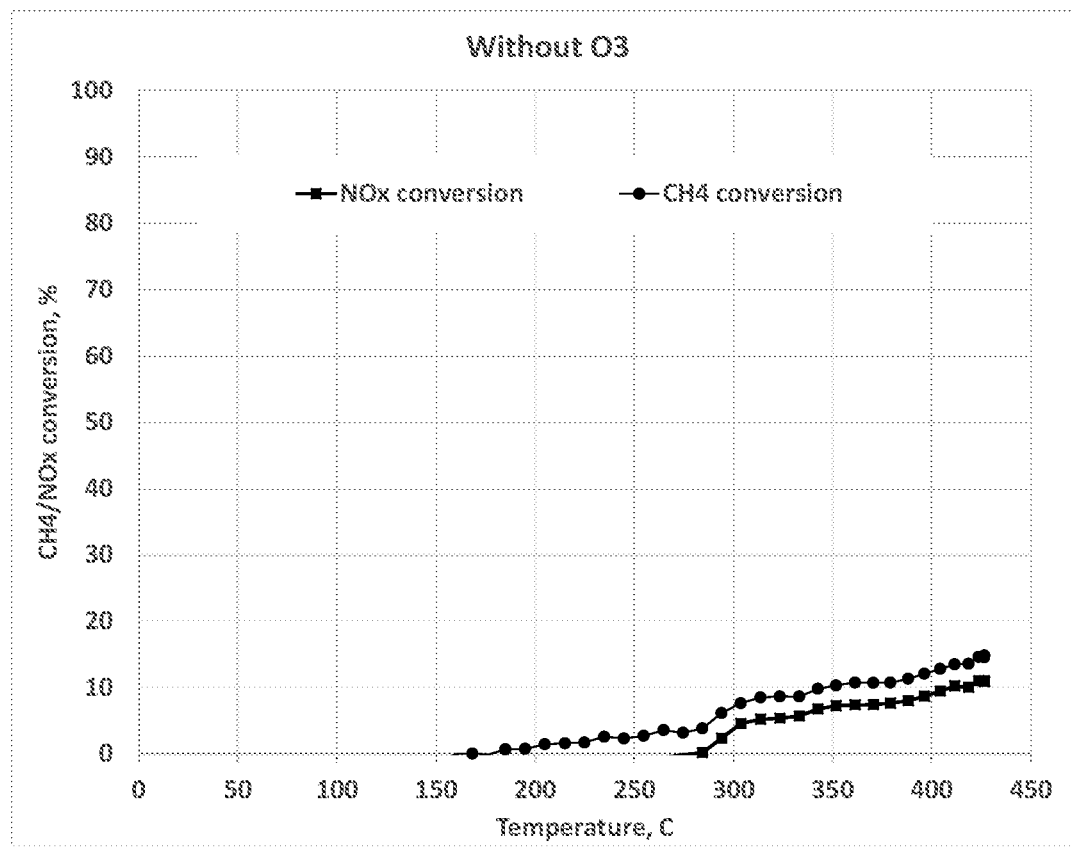
FIG. 9 is a graph showing methane and $NO_x$ conversion against temperature in accordance with Comparative Example 1.

The data in FIG. 9 indicates that the addition of ozone to the feed plays a crucial role in the low temperature removal of hydrocarbons and $NO_x$ from the feed stream.

Comparative Example 2

A reactor experiment was conducted according to the general procedure above with a feed stream comprising methane (195 ppm). Temperature was ramped down from around 435° C. to 100° C. The catalyst used was a copper zeolite catalyst obtained commercially. The methane conversion with varying temperature is shown in FIG. 10.

Figure 10:
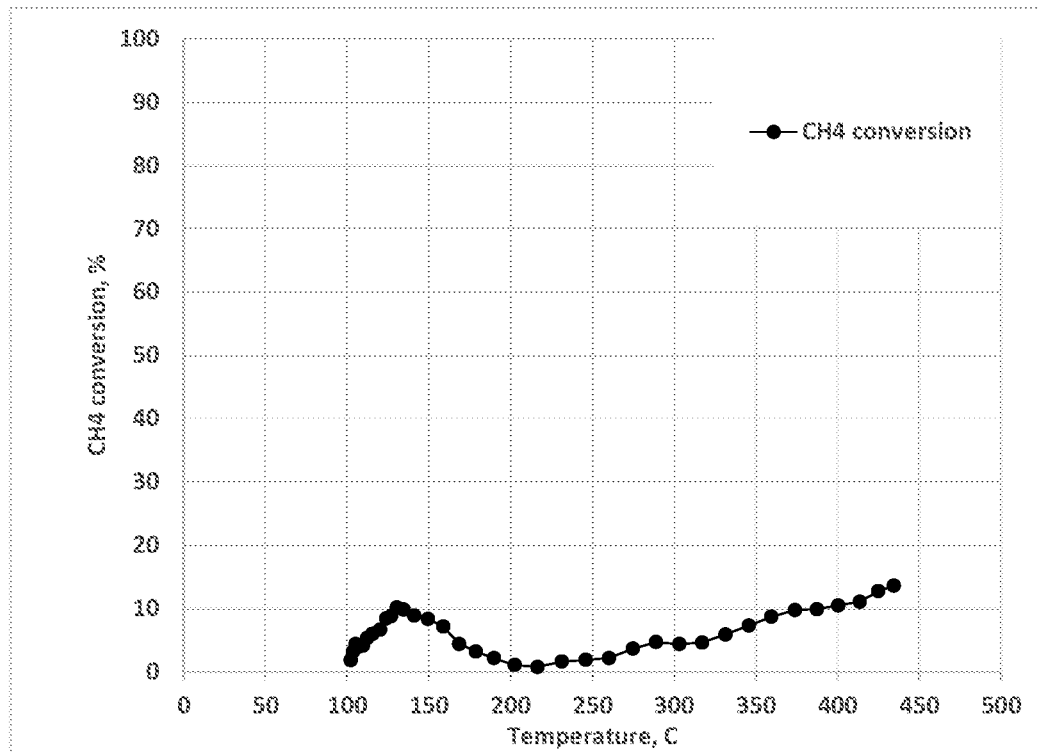
FIG. 10 is a graph showing methane conversion against temperature in accordance with Comparative Example 2.

The data in FIG. 10 shows that the copper catalyst performs poorly and does not show the same low temperature activity for removal of hydrocarbons. In this way there is a certain synergy between the use of the supported iron catalyst and the introduction of ozone to the feed.

Comparative Example 3

A reactor experiment was conducted according to Comparative Example 2, except with a feed comprising methane (204 ppm) and NO (195 ppm). The methane and $NO_x$ conversions with varying temperature are shown in FIG. 11.

Figure 11:
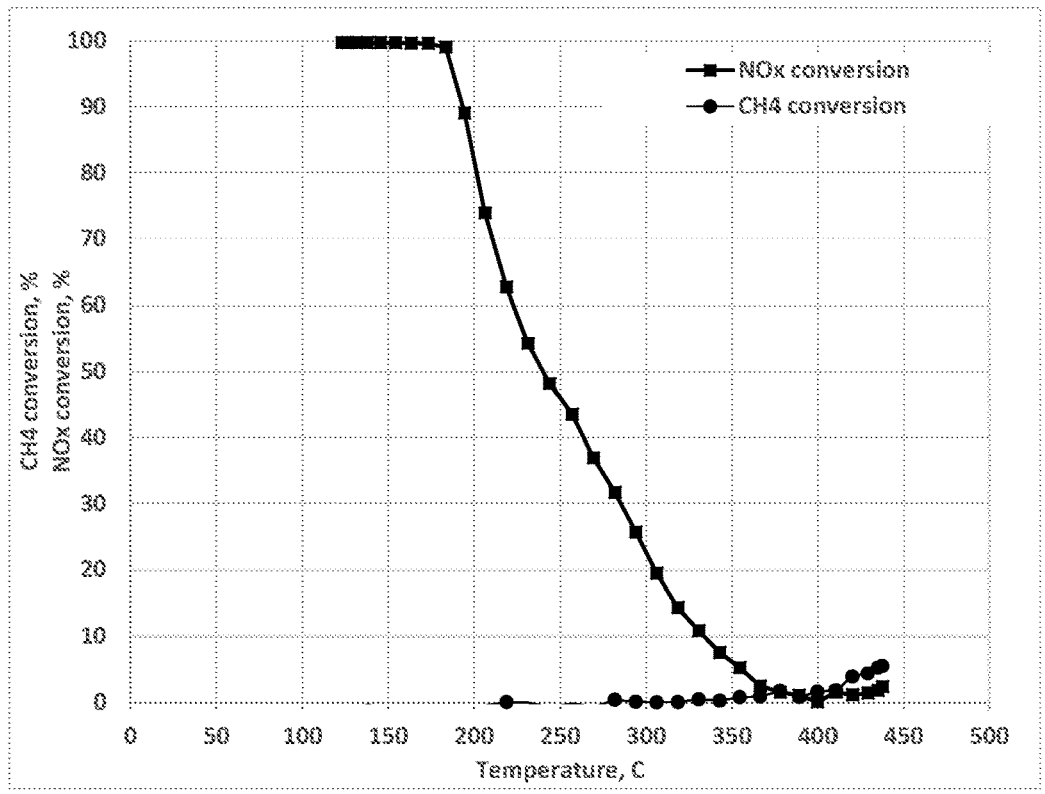
FIG. 11 is a graph showing methane and $NO_x$ conversion against temperature in accordance with Comparative Example 3.

FIG. 11 similarly shows very poor methane conversion at low temperature. The copper catalyst does facilitate conversion of $NO_x$ at low temperatures, however the temperature range where the copper catalyst is effective is narrower than for the iron catalyst.

Comparative Example 4

A reactor experiment was conducted according to the general procedure above with a feed stream comprising methane (178 ppm) and NO (195 ppm). Temperature was ramped down from around 390° C. to 70° C. The catalyst used was a magnesium oxide (MgO) catalyst (300 mg). This experiment was repeated with water 3%, without $NO_x$, and with water and without $NO_x$. The methane and $NO_x$ conversions with varying temperature are shown in FIG. 12.

Figure 12:
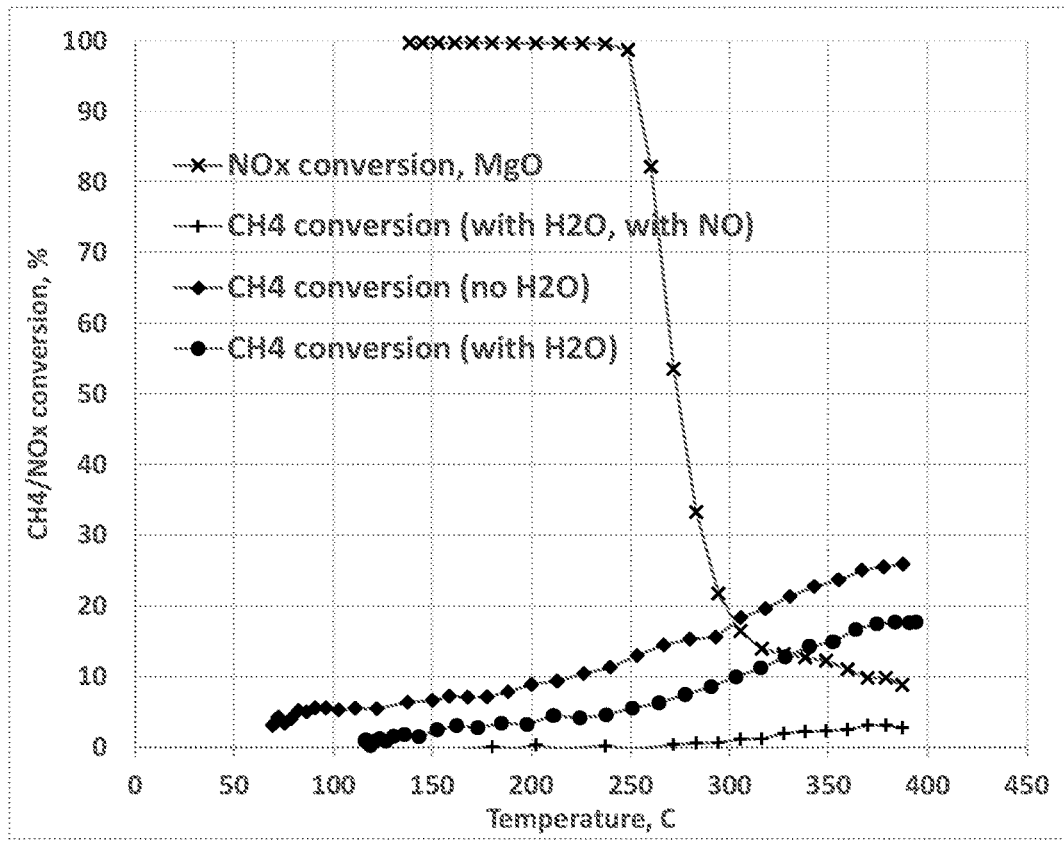
FIG. 12 is a graph showing methane and $NO_x$ conversion against temperature in accordance with Comparative Example 4.

The data in FIG. 12 shows that the MgO based catalyst performs poorly and does not show the same low temperature activity for removal of hydrocarbons. In this way there is a certain synergy between the use of the supported iron catalyst and the introduction of ozone to the feed.

This experiment was repeated with 1200 mg MgO and no increase in methane conversion was observed.

Comparative Example 5

A reactor experiment was conducted according to the general procedure above with a feed stream comprising methane (179 ppm). Temperature was ramped down from around 440° C. to 125° C. The catalyst used was iron (3 wt. %) supported on magnesium oxide (MgO). The methane conversion with varying temperature is shown in FIG. 13.

Figure 13:
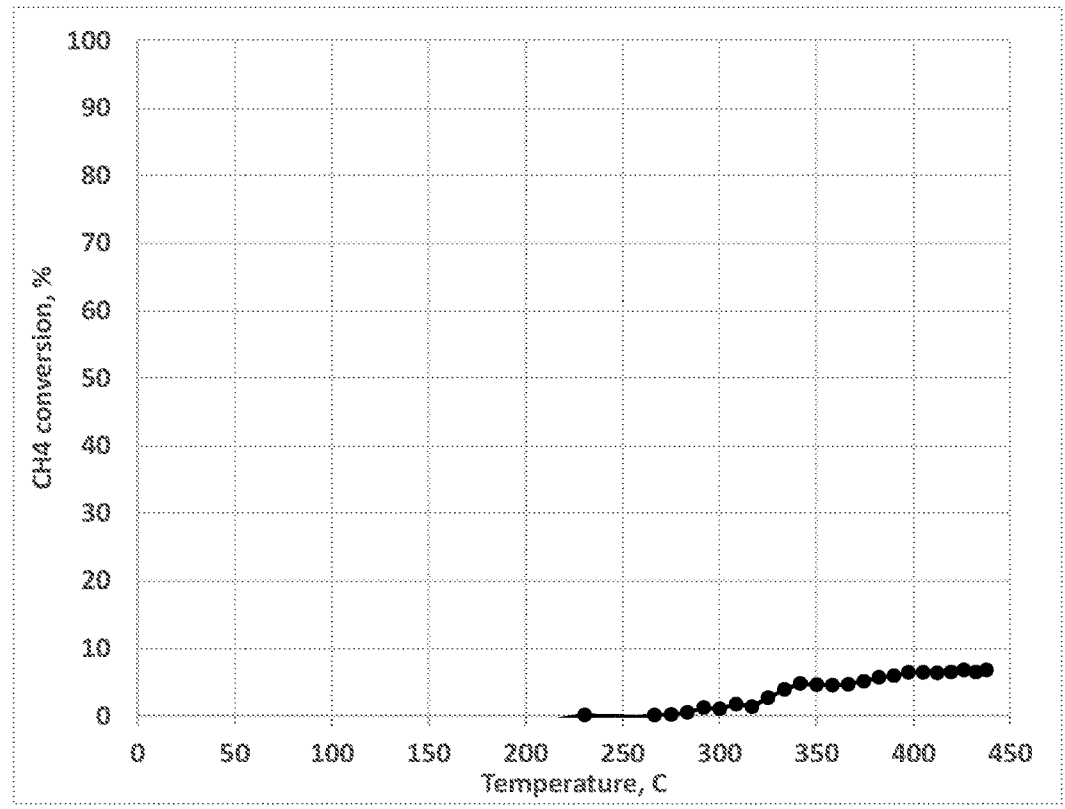
FIG. 13 is a graph showing methane conversion against temperature in accordance with Comparative Example 5.

The data in FIG. 13 shows that the iron supported on MgO performs poorly and does not show the same low temperature activity for removal of hydrocarbons as the iron supported on zeolite. In this way there is a certain synergy between the use of an iron catalyst supported on aluminosilicates, silica-aluminas, silicates and/or aluminas and the introduction of ozone to the feed.

Comparative Example 6

A reactor experiment was conducted according to the general procedure above with a feed stream comprising methane (196 ppm) and NO (197 ppm). Temperature was ramped down from around 225° C. to 125° C. No catalyst was used and the reactor was empty with no cordierite core. No methane conversion was observed.

Figure 14:
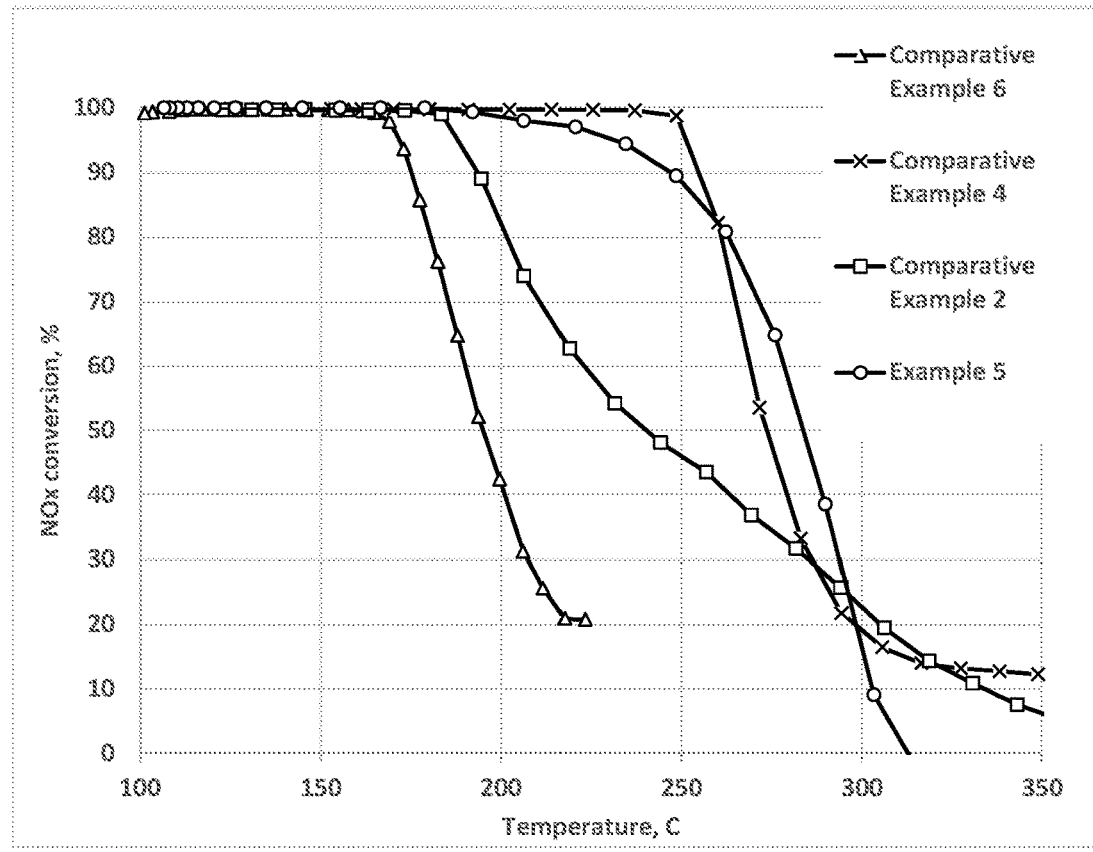
FIG. 14 is a graph showing $NO_x$ conversion against temperature in accordance with Example 5 and Comparative Examples 3, 4 and 6.

Some conversion of $NO_x$ was observed at low temperature without the catalyst, however the effective temperature range was much narrower than for the iron zeolite catalyst. A comparison of $NO_x$ conversions with temperature for the experiments of Example 5 and Comparative Examples 3, 4 and 6 is shown in FIG. 14.

The invention may also be defined by the following clauses:

1. A process for removing hydrocarbons from a feed stream containing hydrocarbons, the process comprising: introducing ozone to the feed stream to produce an ozone doped stream containing ozone and hydrocarbons; and contacting the ozone doped stream with a supported metal catalyst at a temperature of from 100° C. to 300° C. to produce a treated stream; wherein the supported metal catalyst comprises iron supported on a support selected from aluminosilicates, silica-aluminas, silicates and aluminas.

2. The process of Clause 1, wherein the ozone doped stream is contacted with the supported metal catalyst at a temperature of from 130° C. to 280° C., preferably from 180° C. to 250° C., more preferably from 200° C. to 240° C., most preferably from 220° C. to 230° C., for example 225° C.

3. The process of any preceding clause, wherein the support of the supported metal catalyst comprises an aluminosilicate support, preferably a zeolite support, for example beta zeolite.

4. The process of any preceding clause, wherein the contacting step comprises providing a flow of the ozone doped stream over the supported metal catalyst continuously for greater than 1 minute, preferably greater than 5 minutes, more preferably greater than 30 minutes, for example greater than 1 hour.

5. The process of any preceding clause, wherein the contacting step is conducted at a pressure of 10 bar absolute or less, preferably 5 bar absolute or less, more preferably 2 bar absolute or less, for example at around atmospheric pressure.

6. The process of any preceding clause, wherein the feed stream comprises an exhaust stream from a hydrocarbon combustion process or a waste gas stream from an industrial process.

7. The process of Clause 6, wherein the feed stream comprises an exhaust stream from an internal combustion engine, for example from a diesel engine, a gasoline engine or a natural gas engine.

8. The process of any preceding clause, wherein the ozone introduced to the feed stream is generated by an ozone generator in situ.

9. The process of Clause 8, wherein the ozone introduced to the feed stream is generated by a corona discharge ozone generator, a cold plasma ozone generator or a UV ozone generator.

10. The process of any preceding clause, wherein water is present in the feed stream or the ozone doped stream in an amount of up to 15% v/v, optionally up to 5% v/v, optionally up to 3% v/v, optionally up to 1% v/v, for example, up to 0.5% v/v.

11. The process of any preceding clause, wherein the process comprises removing $C_1$ to $C_{20}$ hydrocarbons from a feed stream containing $C_1$ to $C_{20}$ hydrocarbons, preferably $C_1$ to $C_{10}$ hydrocarbons, more preferably $C_1$ to $C_4$ hydrocarbons, most preferably removing methane.

12. The process of Clause 10, wherein the feed stream further comprises $NO_x$.

13. The process of Clause 12, wherein the concentration of $NO_x$ in the feed stream is at least 50 ppm, preferably at least 100 ppm, more preferably at least 300 ppm, for example at least 500 ppm.

14. The process of any of Clauses 1 to 13, wherein the concentration of NO in the feed stream is less than 100 ppm, preferably less than 50 ppm, for example less than 20 ppm.

15. The process of any preceding clause, wherein the treated stream has an increased concentration of hydrogen relative to the feed stream.

16. A process for removing $NO_x$ from a feed stream containing $NO_x$, the process comprising: introducing ozone to the feed stream to produce an ozone doped stream containing ozone and $NO_x$; and contacting the ozone doped stream with a supported metal catalyst at a temperature of from 100° C. to 300° C. to produce a treated stream; wherein the supported metal catalyst comprises iron supported on a support selected from aluminosilicates, silica-aluminas, silicates and aluminas, and wherein the ozone doped stream contains water.

17. The process of Clause 16, wherein the contacting step is as defined in any of Clauses 2, 4 or 5.

18. The process of Clause 16 or 17, wherein the support of the supported metal catalyst comprises an aluminosilicate support, preferably a zeolite support, for example beta zeolite.

19. The process of any of Clauses 16 to 18, wherein the feed stream or ozone doped stream is as defined in any of Clauses 6, 7, 10, 11 or 13.

20. The process of any of Clauses 16 to 19, wherein the ozone introduced to the feed stream is as defined in Clause 8 or Clause 9.

21. An apparatus for removing hydrocarbons and/or $NO_x$ from a feed stream containing hydrocarbons and/or $NO_x$, the apparatus comprising: a source of ozone arranged to introduce ozone to the feed stream to produce an ozone doped stream containing ozone and hydrocarbons and/or $NO_x$; a supported metal catalyst comprising iron supported on a support selected from aluminosilicates, silica-aluminas, silicates and aluminas; wherein the apparatus is arranged to contact the ozone doped stream with the supported metal catalyst at a temperature of from 100° C. to 300° C.

22. The apparatus of Clause 21, wherein the support of the supported metal catalyst comprises an aluminosilicate support, preferably a zeolite support, for example beta zeolite.

23. The apparatus of Clause 21 or Clause 22, wherein the apparatus is arranged to receive an exhaust stream from a hydrocarbon combustion process or a waste gas stream from an industrial process as at least a portion of the feed stream.

24. The apparatus of Clause 23, further comprising means for carrying out hydrocarbon combustion and feeding an exhaust stream to the apparatus as at least a portion of the feed stream.

25. The apparatus of Clause 24, wherein the means for carrying out hydrocarbon combustion comprises an internal combustion engine, for example a diesel engine, a gasoline engine or a natural gas engine.

26. The apparatus of any of Clauses 21 to 25, wherein the apparatus is configured so that the ozone doped stream is contacted with the supported metal catalyst at a temperature of from 130° C. to 280° C., preferably from 180° C. to 250° C., more preferably from 200° C. to 240° C., most preferably from 220° C. to 230° C., for example 225° C.

27. The apparatus of any of Clauses 21 to 26, wherein the apparatus is configured to provide a flow of the ozone doped stream over the supported metal catalyst continuously for greater than 1 minute, preferably greater than 5 minutes, more preferably greater than 30 minutes, for example greater than 1 hour.

28. The apparatus of any of Clauses 21 to 27, wherein the apparatus is configured to contact the ozone doped stream with the supported metal catalyst at a pressure of 10 bar absolute or less, preferably 5 bar absolute or less, more preferably 2 bar absolute or less, for example at around atmospheric pressure.

29. The apparatus of any of Clauses 21 to 28, wherein the source of ozone comprises an ozone generator configured to generate ozone in situ.

30. The apparatus of Clause 29, wherein the ozone generator comprises a corona discharge ozone generator, a cold plasma ozone generator or a UV ozone generator.

31. An industrial processing plant comprising an apparatus as defined in any of Clauses 21 to 24 or 26 to 30 for reducing emissions of hydrocarbons and/or $NO_x$.

32. A vehicle comprising an apparatus as defined in any of Clauses 21 to 30 for reducing emissions of hydrocarbons and/or $NO_x$.

33. A process for generating hydrogen from a feed stream containing hydrocarbons, the process comprising: introducing ozone to the feed stream to produce an ozone doped stream containing ozone and hydrocarbons; and contacting the ozone doped stream with a supported metal catalyst at a temperature of from 100° C. to 300° C. to produce a hydrogen enriched stream; wherein the supported metal catalyst comprises iron supported on a support selected from aluminosilicates, silica-aluminas, silicates and aluminas.

34. The process of Clause 33, wherein the contacting step is as defined in any of Clauses 2, 4 or 5.

35. The process of Clause 33 or Clause 34, wherein the support of the supported metal catalyst comprises an aluminosilicate support, preferably a zeolite support, for example beta zeolite.

36. The process of any of Clauses 33 to 35, wherein the feed stream comprises an exhaust stream from a hydrocarbon combustion process or a waste gas stream from an industrial process.

37. The process of any of Clauses 33 to 36, wherein the feed stream or ozone doped stream is as defined in any of Clauses 6, 7 or 10 to 14.

38. The process of any of Clauses 33 to 37, wherein the ozone introduced to the feed stream is as defined in Clause 8 or Clause 9.

39. Use of ozone and a supported metal catalyst comprising iron supported on a support selected from aluminosilicates, silica-aluminas, silicates and aluminas for removing hydrocarbons from a feed stream containing hydrocarbons, by introducing ozone to the feed stream to produce an ozone doped stream and contacting the ozone doped stream with the supported metal catalyst.

40. Use of ozone and a supported metal catalyst comprising iron supported on a support selected from aluminosilicates, silica-aluminas, silicates and aluminas for removing $NO_x$ from a feed stream containing $NO_x$, by introducing ozone to the feed stream to produce an ozone doped stream and contacting the ozone doped stream with the supported metal catalyst.

41. Use of ozone and a supported metal catalyst comprising iron supported on a support selected from aluminosilicates, silica-aluminas, silicates and aluminas for generating hydrogen from a feed stream comprising hydrocarbons, by introducing ozone to the feed stream to produce an ozone doped stream and contacting the ozone doped stream with the supported metal catalyst.

42. Use according to any of Clauses 39 to 41, wherein the contacting step is as defined in any of Clauses 2, 4 or 5.

43. Use according to any of Clauses 39 to 42, wherein the support of the supported metal catalyst comprises an aluminosilicate support, preferably a zeolite support, for example beta zeolite.

44. Use according to any of Clauses 39 to 43, wherein the feed stream or ozone doped stream is as defined in any of Clauses 6, 7 or 10 to 14.

45. Use according to any of Clauses 39 to 44, wherein the ozone introduced to the feed stream is as defined in Clause 8 or Clause 9.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A process for removing hydrocarbons from a feed stream containing hydrocarbons, the process comprising:
   introducing ozone to the feed stream to produce an ozone doped stream containing ozone and hydrocarbons, wherein the hydrocarbons include methane; and
   contacting the ozone doped stream with a supported metal catalyst at a temperature of from 100° C. to 300° C. to produce a treated stream having a reduced methane concentration in comparison to the ozone doped stream;
   wherein a maximum in methane conversion of at least about 40% occurs between 100° C. to 300° C., and
   wherein the supported metal catalyst comprises iron supported on an aluminosilicate support, wherein the aluminosilicate is a beta zeolite.

2. The process of claim 1, wherein the ozone doped stream is contacted with the supported metal catalyst at a temperature of from 130° C. to 280° C.

3. The process of claim 1, wherein the contacting step comprises providing a flow of the ozone doped stream over the supported metal catalyst continuously for greater than 1 minute.

4. The process of claim 1, wherein the feed stream comprises an exhaust stream from a hydrocarbon combustion process or a waste gas stream from an industrial process.

5. The process of claim 1, wherein the ozone introduced to the feed stream is generated by an ozone generator in situ.

6. The process claim 1, wherein water is present in the feed stream or the ozone doped stream in an amount of up to 15% v/v.

7. The process of claim 6, wherein the feed stream further comprises NON.

8. The process of claim 7, wherein the concentration of NO in the feed stream is at least 50 ppm.

9. The process of claim 1, wherein the concentration of NO in the feed stream is less than 100 ppm.

10. The process of claim 1, wherein the treated stream has an increased concentration of hydrogen relative to the feed stream.

11. The process of claim 1, wherein the maximum in methane conversion ranges from about 40% to about 80%.

12. The process of claim 1, wherein the iron is supported on the beta zeolite by ion-exchange.

* * * * *